(12) United States Patent
Miyasaka et al.

(10) Patent No.: US 6,363,407 B1
(45) Date of Patent: Mar. 26, 2002

(54) EXPONENTIAL CALCULATION DEVICE AND DECODING DEVICE

(75) Inventors: Shuji Miyasaka, Neyagawa; Takeshi Fujita, Takatsuki; Masahiro Sueyoshi; Akihisa Kawamura, both of Hirakata; Masaharu Matsumoto; Takashi Katayama, both of Katano; Kazutaka Abe, Kadoma; Kosuke Nishio, Neyagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/929,156

(22) Filed: Aug. 14, 2001

Related U.S. Application Data

(62) Division of application No. 09/244,155, filed on Feb. 3, 1999, now Pat. No. 6,304,890.

(30) Foreign Application Priority Data

| Feb. 4, 1998 | (JP) | ............................................. | 10-023022 |
| May 14, 1998 | (JP) | ............................................. | 10-131636 |
| May 28, 1998 | (JP) | ............................................. | 10-147348 |
| Jan. 14, 1999 | (JP) | ............................................. | 11-008562 |
| Jan. 26, 1999 | (JP) | ............................................. | 11-017702 |

(51) Int. Cl.$^7$ ................................................. G06F 7/38
(52) U.S. Cl. ........................................ 708/606; 708/491
(58) Field of Search ......................... 708/606, 512, 708/517, 491

(56) References Cited

U.S. PATENT DOCUMENTS

| 4,225,933 | A | | 9/1980 | Monden | ...................... 708/606 |
| 4,410,956 | A | | 10/1983 | Yoshida | ...................... 708/606 |
| 5,177,702 | A | | 1/1993 | Lindsley | ...................... 708/606 |
| 5,912,830 | A | | 6/1999 | Krech, Jr. et al. | ........... 708/606 |
| 5,926,406 | A | | 7/1999 | Tucker et al. | ................ 708/606 |
| 5,935,200 | A | | 8/1999 | Whittaker | .................... 708/606 |
| 5,974,436 | A | | 10/1999 | Inoue et al. | ................. 708/606 |
| 6,038,318 | A | * | 3/2000 | Roden | ......................... 708/606 |
| 6,128,638 | A | | 10/2000 | Thomas | ....................... 708/606 |
| 6,240,436 | B1 | * | 5/2001 | McGregor | .................. 708/491 |

FOREIGN PATENT DOCUMENTS

| EP | 0 572 695 | 12/1993 |
| EP | 0 737 939 | 10/1996 |

OTHER PUBLICATIONS

European Search Report dated Apr. 12, 2000 for EP 99 10 1618.
Andrews et al., "Evaluation of Functions on Microcomputers: exp(x)", Computers & Mathematics with Applications, vol. 7, No. 6, pp. 503–508, 1981.
Bosi et al., "ISO/IEC MPEG-2 Advanced Audio Coding", Journal of the Audio Engineering Society, US, Audio Engineering Society, New York, vol. 45, No. 10, pp. 789–812, Oct. 1, 1997.
ISO/IEC 13818–7, pp. 57–59, 1997.

* cited by examiner

Primary Examiner—Tan V. Mai
(74) Attorney, Agent, or Firm—Ratner & Prestia

(57) ABSTRACT

A device of the present invention is an exponential calculation device for calculating $x^{(a/b)}$ (where a and b are each an integer constant) for a given input value of x. The device includes: an input control section for outputting a value of x', wherein x'=x when $x \leq A$ (where A is a threshold value within a variable range of x) and $x'=x/2^b$ when x>A; a core section for outputting a value of $z'=x'^{(a/b)}$; and an output control section for outputting a value of z, wherein z=z' when $x \leq A$ and $z=z'*2^a$ when x>A.

16 Claims, 30 Drawing Sheets

FIG.3

| | | |
|---|---|---|
| 0 | 0. 000000 | ROM1 |
| 1 | 1. 000000 | |
| 2 | 2. 519842 | |
| 3 | 4. 326749 | |
| 4 | 6. 349604 | |
| 5 | 8. 549880 | |
| 6 | 10. 902724 | |
| 7 | 13. 390518 | |
| 8 | 16. 000000 | |
| 9 | 18. 720754 | |
| 500 | 3968. 502530 | |
| 1014 | 10187. 100875 | |
| 1015 | 10200. 498344 | |
| 1016 | 10213. 900213 | |
| 1017 | 10227. 306480 | |
| 1018 | 10240. 717141 | |
| 1019 | 10254. 132195 | |
| 1020 | 10267. 551638 | |
| 1021 | 10280. 975446 | |
| 1022 | 10294. 403678 | |
| 1023 | 10307. 836271 | |

FIG.5

| | | |
|---|---|---|
| 0 | 0.000000 | ROM2 |
| 1 | 1.000000 | |
| 2 | 1.259921 | |
| 3 | 1.442250 | |
| 4 | 1.587401 | |
| 5 | 1.709976 | |
| 6 | 1.817121 | |
| 7 | 1.912931 | |
| 8 | 2.000000 | |
| 9 | 2.080084 | |
| ... | ... | |
| 500 | 7.937005 | |
| ... | ... | |
| 1014 | 10.046451 | |
| 1015 | 10.049752 | |
| 1016 | 10.053051 | |
| 1017 | 10.056349 | |
| 1018 | 10.059644 | |
| 1019 | 10.062936 | |
| 1020 | 10.066227 | |
| 1021 | 10.069516 | |
| 1022 | 10.072802 | |
| 1023 | 10.076086 | |

FIG.8

| 0 | 0.000000 | ~ROM3 |
|---|---|---|
| 1 | 1.000000 | |
| 2 | 1.259921 | |
| 3 | 1.442250 | |
| 4 | 1.587401 | |
| 5 | 1.709976 | |
| 6 | 1.817121 | |
| 7 | 1.912931 | |
| 8 | 2.000000 | |
| 9 | 2.080084 | |
| ... | ... | |
| 130 | 5.065797 | |
| ... | ... | |
| 248 | 6.282761 | |
| 249 | 6.291195 | |
| 250 | 6.299605 | |
| 251 | 6.307994 | |
| 252 | 6.316360 | |
| 253 | 6.324704 | |
| 254 | 6.333026 | |
| 255 | 6.341326 | |

FIG.11

| adrs:j | data:2^(j/3) |
|---|---|
| 0 | 0100000000000000000000000000000 |
| 1 | 0101000010100010100010111100110 |
| 2 | 0110010110010111111101010010100 |
| 3 | 0111111111111111111111111111111 |

FIG. 14

| | | |
|---|---|---|
| 0 | 8.000000 | ROM4 |
| 1 | 8.005205 | |
| 2 | 8.010403 | |
| 3 | 8.015595 | |
| 4 | 8.020779 | |
| 5 | 8.025957 | |
| 6 | 8.031129 | |
| 7 | 8.036293 | |
| 8 | 8.041452 | |
| 9 | 8.046603 | |
| 10 | 8.051748 | |
| ... | ... | |
| 504 | 10.053051 | |
| 505 | 10.056349 | |
| 506 | 10.059644 | |
| 507 | 10.062936 | |
| 508 | 10.066227 | |
| 509 | 10.069516 | |
| 510 | 10.072802 | |
| 511 | 10.076086 | |

FIG.15

| adrs:k | data:2^((k-B)/3)    (B=10) |
|---|---|
| 0 | 000001100101100101111111110101001 |
| 1 | 000010000000000000000000000000000 |
| 2 | 000010100001010001010001011111100 |
| 3 | 000011001011001011111111101010010 |
| 4 | 000100000000000000000000000000000 |
| 5 | 000101000010100010100010111111001 |
| 6 | 000110010110010111111110101001001 |
| 7 | 001000000000000000000000000000000 |
| 8 | 001010000101000101000101111110011 |
| 9 | 001100101100101111111101010010100 |
| 10 | 010000000000000000000000000000000 |
| 11 | 010100001010001010001011111100110 |
| 12 | 011001011001011111110101001010... |
| 13 | 011111111111111111111111111111111 |

FIG. 17

| adrs;q | data F(q) |
|---:|:---|
| 0 | 0000000000000000000000000000000 |
| 1 | 0000000100000000000000000000000 |
| 2 | 0000000101000101000101000101111 |
| 3 | 0000000100010100111010010111100110 |
| 4 | 0000001100101100101111111010100 |
| 5 | 0000010001000110011000100111 0101 |
| 6 | 0000010101110011100011000111 0010 |
| 7 | 0000011010110001111110010000000 |
| 8 | 0000011111111111111111111111111 |
| 9 | 0000100101110001000011010 1110 |
| 10 | 0000101011000101101101001 01000 |
| 11 | 0000110000111011010111010010 1100 |
| 12 | 0000110110111100010001111110 1001 |
| 13 | 0000111101000100100111101111 0100 |
| 14 | 0001000011011110111100110010 101 |
| 15 | 0001001001111111001000001000 1111 |
| 16 | 0001010000101000101000101111 1001 |
| 17 | 0001010111011011000110111101 0110 |
| 18 | 0001011110010110001100000010 1100 |
| 19 | 0001100101011001100011011000 0100 |
| 20 | 0001101100100100111010001011 1010 |
| 21 | 0001110011110111111110011111 1001 |
| 22 | 0001111011010010100010101111 0001 |
| 23 | 0010000010110100010110000101 001 |
| 24 | 0010001010011101001011100110 1101 |
| 25 | 0010010010001100110110110101 0110 |
| 26 | 0010011010000011001011111011 001 |
| 27 | 0010100011111111111111111111 1111 |
| 28 | 0010101010000011001000101000 0111 |
| 29 | 0010110010001100011100001010 0111 |
| 30 | 0010111010011011110001011101 0111 |
| 31 | 0011000010110000111111110011 001 |
| 32 | 0000000000000110010110010111 1111 |
| 33 | 0000000000000110100111011001 0100 |
| 34 | 0000000000000110111000100101 1001 |
| 35 | 0000000000000111001001111001 1100 |
| 8186 | 0010100010001110011000111110 010 |
| 8187 | 0010100010010001101111111100 111 |
| 8188 | 0010100010010101000110111100 000 |
| 8189 | 0010100010011000111011110111 110 |
| 8190 | 0010100010011011110100111100 000 |
| 8191 | 0010100010011111001011111100 111 |

FIG.18

| adrs;p | data G(p) |
|---|---|
| 0 | 0100000000000000000000000000000 |
| 1 | 0100110000011011111110000010 1000 |
| 2 | 0101101010000010011110011001 1001 |
| 3 | 0110101110100010011111100110 0101 |

FIG. 20

| adrs;q | data H(q) |
|---|---|
| 0 | 0000000000000000000000000000 |
| 1 | 0000100000000000000000000000 |
| 2 | 0000101000010100010100101111100 |
| 3 | 0000101110010011011010001001000 |
| 4 | 0000110010110010111111110101010 |
| 5 | 0000110110101110000011111011110 |
| 6 | 0000111010001001011101010000101 |
| 7 | 0000111101001101101011101101111 |
| 8 | 0001000000000000000000000000000 |
| 9 | 0001000010010010000000101111100 |
| 10 | 0001000100111000100100010000001 |
| 11 | 0001000111001010101101100010010 |
| 12 | 0001001001010000101111111100001 |
| 13 | 0001001011001111000100010001111 |
| 14 | 0001001101000111111000101010100 |
| 15 | 0001001110111010110011010110101 |
| 16 | 0001010000101000101000101111100 |
| 17 | 0001010010010001111111000010101 |
| 18 | 0001010011110111010001101000011 |
| 19 | 0001010101010110001110101110110 |
| 20 | 0001010110110111100100001010101 |
| 21 | 0001010110000100100100110101100 |
| 22 | 0001011001101010011000100111000 |
| 23 | 0001011011000000011110101010100 |
| 24 | 0001011100010011011010001001001 |
| 25 | 0001011101100100011000110110100 |
| 26 | 0001011110110011001000100100011 |
| 27 | 0001100000000000000000000000000 |
| 28 | 0001100001001010111011100101000 |
| 29 | 0001100010010100001101011011000 |
| 30 | 0001100011011011100111001101110 |
| 31 | 0001100100100000110001100010110 |
| 32 | 0001100101100101001111101010010 |
| 33 | 0001100110101010000001111000010 |
| 34 | 0001100111101010101110011010111 |
| 35 | 0001101000101011001001001101000 |
| 499 | 0011111101110100001001001001111 |
| 500 | 0011111101111110111100010011101 |
| 501 | 0011111110001001101000011110011 |
| 502 | 0011111110010100101000110011001 |
| 503 | 0011111110011111011101010010011 |
| 504 | 0011111110101010001101111100100 |
| 505 | 0011111110110100111101100011010 |
| 506 | 0011111110111111101111100101001 |
| 507 | 0011111111001010011110111110100 |
| 508 | 0011111111010101001100010000011 |
| 509 | 0011111111011111111011111111001 |
| 510 | 0011111111101010101000110010100 |
| 511 | 0011111111110101010001110011011 |
| 512 | 0011111111111111111111111111111 |

FIG.23

| adrs;(p,j) | data I(p,k) |
|---|---|
| (0,0) | 0 0 0 1 0 0 0 0 0 0 0 0 0 0 0 0 0 0 0 0 0 0 0 0 0 0 0 0 0 0 |
| (0,1) | 0 0 0 1 0 1 0 0 0 0 1 0 1 0 0 0 1 0 1 0 0 0 1 0 1 1 1 1 1 0 0 1 |
| (0,2) | 0 0 0 1 1 0 0 1 0 1 1 0 0 1 0 1 1 1 1 1 1 1 1 0 1 0 1 0 0 1 0 1 |
| (0,3) | 0 0 1 0 0 0 0 0 0 0 0 0 0 0 0 0 0 0 0 0 0 0 0 0 0 0 0 0 0 0 |
| (0,4) | 0 0 1 0 1 0 0 0 0 1 0 1 0 0 0 1 0 1 0 0 0 1 0 1 1 1 1 1 0 0 1 1 |
| (1,0) | 0 0 0 1 0 0 1 1 0 0 0 0 0 1 1 0 1 1 1 1 1 1 1 0 0 0 0 0 1 0 1 0 |
| (1,1) | 0 0 0 1 0 1 1 1 1 1 1 1 1 0 0 1 0 0 0 1 0 0 0 0 1 1 0 1 0 1 1 1 |
| (1,2) | 0 0 0 1 1 1 1 0 0 0 1 1 0 1 0 0 0 0 1 1 0 1 1 1 1 1 1 0 0 1 1 1 |
| (1,3) | 0 0 1 0 0 1 1 0 0 0 0 0 1 1 0 1 1 1 1 1 1 1 0 0 0 0 0 1 0 1 0 0 |
| (1,4) | 0 0 1 0 1 1 1 1 1 1 1 1 0 0 1 0 0 0 1 0 0 0 0 1 1 0 1 0 1 1 1 0 |
| (2,0) | 0 0 0 1 0 1 1 0 1 0 1 0 0 0 0 0 1 0 0 1 1 1 1 0 0 1 1 0 0 1 1 0 |
| (2,1) | 0 0 0 1 1 1 0 0 1 0 0 0 0 0 1 0 0 0 1 1 1 1 1 0 0 0 0 0 0 1 1 1 |
| (2,2) | 0 0 1 0 0 0 1 1 1 1 1 0 1 0 1 1 0 0 1 1 0 1 0 1 1 0 0 0 0 1 1 1 |
| (2,3) | 0 0 1 0 1 1 0 1 0 1 0 0 0 0 0 1 0 0 1 1 1 1 0 0 1 1 0 0 1 1 0 0 |
| (2,4) | 0 0 1 1 1 0 0 1 0 0 0 0 0 1 0 0 0 1 1 1 1 1 0 0 0 0 0 0 1 1 1 0 |
| (3,0) | 0 0 0 1 1 0 1 0 1 1 1 0 1 0 0 0 1 0 0 1 1 1 1 1 1 0 0 1 1 0 0 1 |
| (3,1) | 0 0 1 0 0 0 0 1 1 1 1 0 0 1 1 1 0 0 0 1 1 1 1 1 0 0 1 0 0 1 0 1 |
| (3,2) | 0 0 1 0 1 0 1 0 1 0 1 1 0 1 1 1 0 0 0 0 0 0 1 0 0 0 0 1 0 0 0 1 |
| (3,3) | 0 0 1 1 0 1 0 1 1 1 0 1 0 0 0 1 0 0 1 1 1 1 1 1 0 0 1 1 0 0 1 0 |
| (3,4) | 0 1 0 0 0 0 1 1 1 1 0 0 1 1 1 0 0 0 1 1 1 1 1 0 0 1 0 0 1 0 1 1 |

FIG.25

| adrs;(p,j) | data I (p,j) |
|---|---|
| (0,1) | 0 0 0 0 0 0 1 0 1 0 0 0 0 1 0 1 0 0 0 1 0 1 0 0 0 1 0 1 1 1 1 1 |
| (0,2) | 0 0 0 0 0 0 1 1 0 0 1 0 1 1 0 0 1 0 1 1 1 1 1 1 1 0 1 0 1 0 0 |
| (0,3) | 0 0 0 0 0 1 0 0 0 0 0 0 0 0 0 0 0 0 0 0 0 0 0 0 0 0 0 0 0 0 0 |
| (0,4) | 0 0 0 0 0 1 0 1 0 0 0 0 1 0 1 0 0 0 1 0 1 0 0 0 1 0 1 1 1 1 0 |
| (0,5) | 0 0 0 0 0 1 1 0 0 1 0 1 1 0 0 1 0 1 1 1 1 1 1 1 0 1 0 1 0 0 1 |
| (0,6) | 0 0 0 0 1 0 0 0 0 0 0 0 0 0 0 0 0 0 0 0 0 0 0 0 0 0 0 0 0 0 0 |
| (0,7) | 0 0 0 0 1 0 1 0 0 0 0 1 0 1 0 0 0 1 0 1 0 0 0 1 0 1 1 1 1 0 0 |
| (0,8) | 0 0 0 0 1 1 0 0 1 0 1 1 0 0 1 0 1 1 1 1 1 1 1 0 1 0 1 0 0 1 0 |
| (0,9) | 0 0 0 1 0 0 0 0 0 0 0 0 0 0 0 0 0 0 0 0 0 0 0 0 0 0 0 0 0 0 0 |
| (0,10) | 0 0 0 1 0 1 0 0 0 0 1 0 1 0 0 0 1 0 1 0 0 0 1 0 1 1 1 1 0 0 1 |
| (0,11) | 0 0 0 1 1 0 0 1 0 1 1 0 0 1 0 1 1 1 1 1 1 1 0 1 0 1 0 0 1 0 1 |
| (0,12) | 0 0 1 0 0 0 0 0 0 0 0 0 0 0 0 0 0 0 0 0 0 0 0 0 0 0 0 0 0 0 0 |
| (0,13) | 0 0 1 0 1 0 0 0 0 1 0 1 0 0 0 1 0 1 0 0 0 1 0 1 1 1 1 0 0 1 1 |
| (1,1) | 0 0 0 0 0 0 1 0 1 1 1 1 1 1 1 1 0 0 1 0 0 0 1 0 0 0 0 1 1 0 1 0 |
| (1,2) | 0 0 0 0 0 0 1 1 1 1 0 0 0 1 1 0 1 0 0 0 0 1 1 0 1 1 1 1 1 1 0 0 |
| (1,3) | 0 0 0 0 0 1 0 0 1 1 0 0 0 0 0 1 1 0 1 1 1 1 1 1 1 0 0 0 0 0 1 0 |
| (1,4) | 0 0 0 0 0 1 0 1 1 1 1 1 1 1 1 0 0 1 0 0 0 1 0 0 0 0 1 1 0 1 0 1 |
| (1,5) | 0 0 0 0 0 1 1 1 1 0 0 0 1 1 0 1 0 0 0 0 1 1 0 1 1 1 1 1 1 0 0 1 |
| (1,6) | 0 0 0 0 1 0 0 1 1 0 0 0 0 0 1 1 0 1 1 1 1 1 1 1 0 0 0 0 0 1 0 1 |
| (1,7) | 0 0 0 0 1 0 1 1 1 1 1 1 1 1 0 0 1 0 0 0 1 0 0 0 0 1 1 0 1 0 1 1 |
| (1,8) | 0 0 0 0 1 1 1 1 0 0 0 1 1 0 1 0 0 0 0 1 1 0 1 1 1 1 1 1 0 0 1 1 |
| (1,9) | 0 0 0 1 0 0 1 1 0 0 0 0 0 1 1 0 1 1 1 1 1 1 1 0 0 0 0 0 1 0 1 0 |
| (1,10) | 0 0 0 1 0 1 1 1 1 1 1 1 1 0 0 1 0 0 0 1 0 0 0 0 1 1 0 1 0 1 1 1 |
| (1,11) | 0 0 0 1 1 1 1 0 0 0 1 1 0 1 0 0 0 0 1 1 0 1 1 1 1 1 1 0 0 1 1 1 |
| (1,12) | 0 0 1 0 0 1 1 0 0 0 0 0 1 1 0 1 1 1 1 1 1 1 0 0 0 0 0 1 0 1 0 0 |
| (1,13) | 0 0 1 0 1 1 1 1 1 1 1 1 0 0 1 0 0 0 1 0 0 0 0 1 1 0 1 0 1 1 1 0 |
| (2,1) | 0 0 0 0 0 0 1 1 1 0 0 1 0 0 0 0 0 1 0 0 0 1 1 1 1 0 0 0 0 0 0 0 |
| (2,2) | 0 0 0 0 0 1 0 0 0 1 1 1 1 0 1 0 1 1 0 0 1 1 0 1 0 1 1 0 0 0 0 0 |
| (2,3) | 0 0 0 0 0 1 0 1 1 0 1 0 1 0 0 0 0 0 1 0 0 1 1 1 1 0 0 1 1 0 0 1 |
| (2,4) | 0 0 0 0 0 1 1 1 0 0 1 0 0 0 0 0 1 0 0 0 1 1 1 1 0 0 0 0 0 0 0 1 |
| (2,5) | 0 0 0 0 1 0 0 0 1 1 1 1 0 1 0 1 1 0 0 1 1 0 1 0 1 1 0 0 0 0 0 1 |
| (2,6) | 0 0 0 0 1 0 1 1 0 1 0 1 0 0 0 0 0 1 0 0 1 1 1 1 0 0 1 1 0 0 1 1 |
| (2,7) | 0 0 0 0 1 1 1 0 0 1 0 0 0 0 0 1 0 0 0 1 1 1 1 0 0 0 0 0 0 0 1 1 |
| (2,8) | 0 0 0 1 0 0 0 1 1 1 1 0 1 0 1 1 0 0 1 1 0 1 0 1 1 0 0 0 0 0 1 1 |
| (2,9) | 0 0 0 1 0 1 1 0 1 0 1 0 0 0 0 0 1 0 0 1 1 1 1 0 0 1 1 0 0 1 1 0 |
| (2,10) | 0 0 0 1 1 1 0 0 1 0 0 0 0 0 1 0 0 0 1 1 1 1 0 0 0 0 0 0 0 1 1 1 |
| (2,11) | 0 0 1 0 0 0 1 1 1 1 1 0 1 0 1 1 0 0 1 1 0 1 0 1 1 0 0 0 0 1 1 1 |
| (2,12) | 0 0 1 0 1 1 0 1 0 1 0 0 0 0 0 1 0 0 1 1 1 1 0 0 1 1 0 0 1 1 0 0 |
| (2,13) | 0 0 1 1 1 0 0 1 0 0 0 0 0 1 0 0 0 1 1 1 1 0 0 0 0 0 0 0 1 1 1 0 |
| (3,1) | 0 0 0 0 0 1 0 0 0 0 1 1 1 0 0 1 1 1 0 0 0 1 1 1 1 1 0 0 1 0 0 |
| (3,2) | 0 0 0 0 0 1 0 1 0 1 0 1 0 1 1 0 1 1 1 0 0 0 0 0 0 1 0 0 0 0 1 0 |
| (3,3) | 0 0 0 0 1 1 0 1 0 1 1 1 0 1 0 0 0 1 0 0 1 1 1 1 1 0 0 1 1 0 |
| (3,4) | 0 0 0 0 1 0 0 0 0 1 1 1 1 0 0 1 1 1 0 0 0 1 1 1 1 1 0 0 1 0 0 1 |
| (3,5) | 0 0 0 0 1 0 1 0 1 0 1 0 1 1 0 1 1 1 0 0 0 0 0 0 1 0 0 0 0 1 0 0 |
| (3,6) | 0 0 0 0 1 1 0 1 0 1 1 1 0 1 0 0 0 1 0 0 1 1 1 1 1 0 0 1 1 0 0 |
| (3,7) | 0 0 0 1 0 0 0 0 1 1 1 1 0 0 1 1 1 0 0 0 1 1 1 1 1 0 0 1 0 0 1 0 |
| (3,8) | 0 0 0 1 0 1 0 1 0 1 0 1 0 1 1 0 1 1 1 0 0 0 0 0 0 1 0 0 0 0 1 0 0 |
| (3,9) | 0 0 0 1 1 0 1 0 1 1 1 0 1 0 0 0 1 0 0 1 1 1 1 1 0 0 1 1 0 0 1 |
| (3,10) | 0 0 1 0 0 0 0 0 1 1 1 1 0 0 1 1 1 0 0 0 1 1 1 1 1 0 0 1 0 0 1 0 1 |
| (3,11) | 0 0 1 0 1 0 1 0 1 0 1 1 0 1 1 1 0 0 0 0 0 0 1 0 0 0 0 1 0 0 0 1 |
| (3,12) | 0 0 1 1 0 1 0 1 1 1 0 1 0 0 0 1 0 0 1 1 1 1 1 0 0 1 1 0 0 1 0 |
| (3,13) | 0 1 0 0 0 0 1 1 1 1 0 0 1 1 1 0 0 0 1 1 1 1 1 0 0 1 0 0 1 0 1 1 |

FIG.26

| adrs;q | data H(q) |
|---|---|
| 0 | 0011001011001011111111101010001010 |
| 1 | 0011001011011100111001100101010010 |
| 2 | 0011001011101101110001000001000011 |
| 3 | 0011001011111101001011011001111 |
| 4 | 0011001100001111010111100110101001 |
| 5 | 0011001100100000000110110000000100 |
| 6 | 0011001100110000110011001010101111 |
| 7 | 0011001101000010111001101111111 |
| 8 | 0011001101010010000011110000100 |
| 9 | 0011001101100010101000001101000000 |
| 10 | 0011001101110011001001110111100011 |
| 11 | 0011001110000011101000111000000000 |
| 12 | 0011001110010100000101010000000110 |
| 13 | 0011001110100100011110000010111 |
| 14 | 0011001110110100110110001100001111 |
| 15 | 0011001111000101001010110001101111 |
| 236 | 0011111001001111010011101101101 |
| 237 | 0011111001100101100010111111100 |
| 238 | 0011111001111011011010001111010 |
| 239 | 0011111010010001001111001100100 |
| 240 | 0011111010101001110000110001001111 |
| 241 | 0011111010101111001101001010111100 |
| 242 | 0011111011010010100100011010100 |
| 243 | 0011111011101000010001001001001011 |
| 244 | 0011111011111101111110010011101 |
| 245 | 0011111110001001110100001110011 |
| 246 | 0011111110010100101001000001100110001 |
| 247 | 0011111110011111011101010010011 |
| 248 | 0011111110101010001101111100100 |
| 249 | 0011111110110100111110110001101 |
| 250 | 0011111110111111101111111100101001 |
| 251 | 0011111111001010011110111111010 |
| 252 | 0011111111010101001110001100001111 |
| 253 | 0011111111011111111011111111110010 |
| 254 | 0011111111101010101000111000101001 |
| 255 | 0011111111111010101010011100011101 |

FIG.27

| | |
|---|---|
| 0 | 0.000000 |
| 1 | 1.000000 |
| 2 | 2.519842 |
| 3 | 4.326749 |
| 4 | 6.349604 |
| 5 | 8.549880 |
| 6 | 10.902724 |
| 7 | 13.390518 |
| 8 | 16.000000 |
| 9 | 18.720754 |
| ... | ... |
| 8180 | 164817.910834 |
| 8181 | 164844.776566 |
| 8182 | 164871.643393 |
| 8183 | 164898.511315 |
| 8184 | 164925.380331 |
| 8185 | 164952.250442 |
| 8186 | 164979.121647 |
| 8187 | 165005.993946 |
| 8188 | 165032.867339 |
| 8189 | 165059.741827 |
| 8190 | 165086.617408 |
| 8191 | 165113.494083 |

FIG. 29

| adrs;x | data f(x) |
|---|---|
| 0 | 0 0 0 0 0 0 0 0 0 0 0 0 0 0 0 0 0 0 0 0 0 0 0 0 0 0 0 0 0 0 0 0 |
| 1 | 0 0 0 0 0 0 0 0 0 0 0 0 0 0 0 0 0 0 0 0 0 0 0 1 0 0 0 0 0 0 0 0 |
| 2 | 0 0 0 0 0 0 0 0 0 0 0 0 0 0 0 0 0 0 0 0 1 0 1 0 0 0 0 1 0 1 0 1 |
| 3 | 0 0 0 0 0 0 0 0 0 0 0 0 0 0 0 0 0 0 0 1 0 0 0 1 0 1 0 0 1 1 1 0 |
| 4 | 0 0 0 0 0 0 0 0 0 0 0 0 0 0 0 0 0 0 1 1 0 0 1 0 1 1 0 0 1 0 1 1 1 |
| 5 | 0 0 0 0 0 0 0 0 0 0 0 0 0 0 0 0 0 0 1 0 0 0 1 0 0 0 1 1 0 0 1 1 0 0 |
| 6 | 0 0 0 0 0 0 0 0 0 0 0 0 0 0 0 0 0 0 1 0 1 0 1 1 1 0 0 1 1 1 0 0 0 1 |
| 7 | 0 0 0 0 0 0 0 0 0 0 0 0 0 0 0 0 0 0 1 1 0 1 0 1 1 0 0 0 1 1 1 1 1 1 |
| 8 | 0 0 0 0 0 0 0 0 0 0 0 0 0 0 0 0 0 0 1 1 1 1 1 1 1 1 1 1 1 1 1 1 1 1 |
| 9 | 0 0 0 0 0 0 0 0 0 0 0 0 0 0 0 0 0 1 0 0 1 0 1 0 1 1 1 0 0 0 1 0 0 0 |
| 10 | 0 0 0 0 0 0 0 0 0 0 0 0 0 0 0 0 0 1 0 1 0 1 1 0 0 0 1 0 1 1 0 1 0 1 |
| 11 | 0 0 0 0 0 0 0 0 0 0 0 0 0 0 0 0 0 1 1 0 0 0 0 1 1 1 0 1 1 0 1 0 1 1 |
| 12 | 0 0 0 0 0 0 0 0 0 0 0 0 0 0 0 0 0 1 1 0 1 1 0 1 1 1 1 0 0 1 0 0 0 1 |
| 13 | 0 0 0 0 0 0 0 0 0 0 0 0 0 0 0 0 0 1 1 1 1 0 1 0 0 1 0 0 0 1 0 0 1 1 |
| 14 | 0 0 0 0 0 0 0 0 0 0 0 0 0 0 0 0 1 0 0 0 0 1 1 0 1 1 1 1 0 1 1 1 1 1 |
| 15 | 0 0 0 0 0 0 0 0 0 0 0 0 0 0 0 0 1 0 0 1 0 0 1 1 1 1 1 1 1 1 0 0 1 0 0 |
| 16 | 0 0 0 0 0 0 0 0 0 0 0 0 0 0 0 0 1 0 1 0 0 0 0 1 0 1 0 0 0 1 0 1 0 0 |
| 17 | 0 0 0 0 0 0 0 0 0 0 0 0 0 0 0 0 1 0 1 0 1 1 1 0 1 1 0 1 1 0 0 0 1 1 |
| 18 | 0 0 0 0 0 0 0 0 0 0 0 0 0 0 0 0 1 0 1 1 1 0 0 1 0 1 1 0 0 0 1 1 0 |
| 19 | 0 0 0 0 0 0 0 0 0 0 0 0 0 0 0 0 1 1 0 0 1 0 1 0 1 1 0 0 1 1 0 0 0 1 |
| 20 | 0 0 0 0 0 0 0 0 0 0 0 0 0 0 0 0 1 1 0 1 1 0 0 1 0 0 1 0 0 1 1 1 0 1 |
| 21 | 0 0 0 0 0 0 0 0 0 0 0 0 0 0 0 0 1 1 1 0 0 1 1 1 1 0 1 1 1 1 1 1 1 1 |
| 22 | 0 0 0 0 0 0 0 0 0 0 0 0 0 0 0 0 1 1 1 1 0 1 1 0 1 0 0 1 0 1 0 0 0 1 |
| 23 | 0 0 0 0 0 0 0 0 0 0 0 0 0 0 0 1 0 0 0 0 0 1 0 1 1 0 1 0 0 0 1 0 1 1 |
| 24 | 0 0 0 0 0 0 0 0 0 0 0 0 0 0 0 1 0 0 0 1 0 1 0 0 1 1 1 0 1 0 0 1 0 1 |
| 25 | 0 0 0 0 0 0 0 0 0 0 0 0 0 0 0 1 0 0 1 0 0 1 0 0 0 1 1 0 0 1 1 0 1 1 |
| 26 | 0 0 0 0 0 0 0 0 0 0 0 0 0 0 0 1 0 0 1 1 0 1 0 0 0 0 0 1 1 0 0 1 0 1 |
| 27 | 0 0 0 0 0 0 0 0 0 0 0 0 0 0 0 1 0 1 0 0 0 0 1 1 1 1 1 1 1 1 1 1 1 |
| 28 | 0 0 0 0 0 0 0 0 0 0 0 0 0 0 0 1 0 1 0 1 0 1 0 0 0 0 0 1 1 0 0 1 0 0 |
| 29 | 0 0 0 0 0 0 0 0 0 0 0 0 0 0 0 1 0 1 1 0 0 1 0 0 0 1 1 0 0 0 1 1 1 0 |
| 30 | 0 0 0 0 0 0 0 0 0 0 0 0 0 0 0 1 0 1 1 1 0 1 0 0 1 1 0 1 1 1 1 0 0 0 |
| 31 | 0 0 0 0 0 0 0 0 0 0 0 0 0 0 0 1 1 0 0 0 0 1 0 1 1 0 0 0 0 1 1 1 1 1 |
| 32 | 0 0 0 0 0 0 0 0 0 0 0 0 0 0 0 1 1 0 0 1 0 1 1 0 0 1 0 1 1 1 1 1 1 1 |
| 33 | 0 0 0 0 0 0 0 0 0 0 0 0 0 0 0 1 1 0 1 0 0 1 1 1 0 1 1 0 0 1 0 1 0 0 |
| 34 | 0 0 0 0 0 0 0 0 0 0 0 0 0 0 0 1 1 0 1 1 1 0 0 0 1 0 0 1 0 1 1 0 0 1 |
| 35 | 0 0 0 0 0 0 0 0 0 0 0 0 0 0 0 1 1 1 0 0 1 0 0 1 1 1 1 1 0 0 1 1 0 0 |
| 8186 | 0 0 1 0 1 0 0 0 1 0 0 0 1 1 1 0 0 1 1 0 0 0 1 1 1 1 1 0 0 1 0 |
| 8187 | 0 0 1 0 1 0 0 0 1 0 0 1 0 0 0 1 1 0 1 1 1 1 1 1 1 1 0 0 1 1 1 |
| 8188 | 0 0 1 0 1 0 0 0 1 0 0 1 0 1 0 1 0 0 0 1 1 0 1 1 1 1 0 0 0 0 0 |
| 8189 | 0 0 1 0 1 0 0 0 1 0 0 1 1 0 0 0 0 1 1 1 0 1 1 1 1 0 1 1 1 1 0 |
| 8190 | 0 0 1 0 1 0 0 0 1 0 0 1 1 0 1 1 1 1 0 1 0 0 1 1 1 1 0 0 0 0 0 |
| 8191 | 0 0 1 0 1 0 0 0 1 0 0 1 1 1 1 1 0 0 1 0 1 1 1 1 1 1 0 0 1 1 1 |

*FIG.30*

| adrs;y%4 | data g(y) |
|---|---|
| 0 | 0100000000000000000000000000000 |
| 1 | 0100110000011011111110000010 1000 |
| 2 | 0101101010000100111100110011001 |
| 3 | 0110101110100010011111100 1100101 |

EXPONENTIAL CALCULATION DEVICE AND DECODING DEVICE

This application is a divisional of U.S. patent application Ser. No. 09/244,155 filed Feb. 3, 1999, U.S. Pat. No. 6,304,890.

BACKGROUND OF THE INVENTION

1. Field of the Invention:

The present invention relates to an exponential calculation device and a decoding device for performing a predetermined calculation for a given encoded bit stream. More particularly, the present invention relates to an exponential calculation device for calculating $x^{(a/b)}$ and a decoding device for calculating $x^{(a/b)} * 2^{(y/c)}$ for given integer values x and y contained in a bit stream which has been encoded based on the MPEG (moving picture experts group) 2 audio encoding standard "AAC".

2. Description of the Related Art:

Conventionally, in order to calculate $z = x^{(a/b)}$ for a given value of x (where a and b are constant values), values of $x^{(a/b)}$ for all the possible values of x are stored in a table whose addresses are associated with the respective values of x. The value of z for a given value of x is obtained by reading out the value stored in the table.

In this specification, "x to a power of (a/b)" is represented as "$x^{(a/b)}$", where the symbol "^" denotes the use of an exponential function, and the symbol "/" denotes a division function. The symbol "*" will also be used herein to denote a multiplication function.

FIG. 27 illustrates a table containing values of $x^{(4/3)}$ for values of x in a range of $0 \leq x \leq 8191$. A decoding operation based on the MPEG 2 audio encoding standard AAC requires calculation of $x^{(4/3)}$ for a value of x in the range from 0 to 8191. When the conventional method of obtaining the value of $x^{(a/b)}$ is employed in the exponential calculation involved in decoding data encoded based on the MPEG 2 audio encoding standard AAC, an input value of x is used as an address for reading out the corresponding value from a table provided in advance, as illustrated in FIG. 27, to obtain the value of $x^{(4/3)}$ an output value z.

In order to decode an encoded bit stream so as to obtain the intended data, it is necessary to perform a predetermined calculation process. A bit stream encoded based on the MPEG 2 audio encoding standard AAC contains a quantization code "x" and a scaling factor "y". The quantization code "x" and the scaling factor "y" are both integers. In the case of the MPEG 2 audio encoding standard AAC, the decoding device calculates $x^{(a/b)} * 2^{(y/c)}$ (where a, b and c are constants) for given values of x and y. Details of the MPEG 2 audio encoding standard AAC are disclosed in ISO/IEC 13818-7:1997, pp.57–59.

Conventionally, an operation of calculating $x^{(a/b)} * 2^{(y/c)}$ for given values of x and y has been performed as follows with a DSP (digital signal processor) of a fixed point format.

FIG. 28 illustrates an exemplary 32-bit fixed point format. Referring to FIG. 28, where the bit 0 is the least significant bit and the bit 31 is the most significant bit, the decimal point is fixed between the bit 30 and the bit 29. In particular, bit 30 represents the integral portion of a value, while the bits 29–0 represent the fractional portion of the value. Bit 31 is the sign bit indicating whether the value is positive or negative. Such a numeric representation with a fixed decimal point is called a "fixed point format".

For example, a value "f" represented in the 32-bit fixed point format, as illustrated in FIG. 28, can vary in the range of $-2 \leq f < 2$. Then, in order to perform a calculation with a fixed-point-format processing unit, such as a DSP, values involved in the calculation are adjusted so that they are each in the range of $\pm 2.0$ before performing the intended calculation.

In the MPEG 2 audio encoding standard AAC, x can vary in the range of $0 \leq x < 8192$, whereas y can vary in the range of $-100 \leq y < 156$. Consider a calculation of Expression (1) below for x and y having such ranges.

$$x^{(4/3)} * 2^{(y/4)} \tag{1}$$

Expression (1) may be calculated as follows based on the prior art technique with a fixed-point-format processing unit. First, Expression (1) is converted to Expression (2) below.

$$x^{(4/3)} * 2^{((y\%4)/4)} * 2^{\text{int}(y/4)} \tag{2}$$

In Expression (2), "(y%4)" represents a remainder of a division y/4, and "int(y/4)" represents a quotient (integer) of the division y/4. In the calculation of Expression (2), $x^{(4/3)}$ is first calculated. The calculation $x^{(4/3)}$ is typically performed using a ROM table. In particular, values of $x^{(4/3)}$ for various values of x are calculated and stored in a table in advance. Then, the value of $x^{(4/3)}$ for a given value of x is obtained by referencing the ROM table using the value of x as the address of the table.

The calculation of Expression (1) or (2) assumes the use of a fixed-point-format processing unit. In particular, different values of $x^{(4/3)}$ are normalized and stored in a table in advance, with the maximum value thereof being normalized to a value which does not exceed 1.0.

FIG. 29 illustrates the contents of a first table for use with a conventional decoding device. The table illustrated in FIG. 29 contains values of f(x) for the range of $0 \leq x < 8192$ at addresses which correspond to the respective values of x. The values of f(x) are obtained by first calculating $x^{(4/3)}$ for various values of x, and then dividing the calculated values by $2^{18}$ to normalize the values so that none of them exceeds 1.0.

In the calculation of Expression (2), $2^{((y\%4)/4)}$ is then calculated. Typically, $2^{((y\%4)/4)}$ is also calculated using a ROM table. In particular, different values of $2^{((y\%4)/4)}$ for various integers (y%4) are calculated and stored in a table in advance. Then, an integer (y%4) is used as an address for referencing the table so as to obtain the value of $2^{((y\%4)/4)}$ for the integer (y%4).

FIG. 30 illustrates the contents of a second table for use with a conventional decoding device. The second table illustrated in FIG. 30 contains values of g(y) for the address values (y%4) in the range from 0 to 3. The values of g(y) are obtained by normalizing values of $2^{((y\%4)/4)}$ so that none of them exceeds 2.0.

After such a table is provided, the value of Expression (2) can be obtained. First, the first table illustrated in FIG. 29 is referenced using an input integer x as an address so as to obtain the normalized value f(x) for $x^{(4/3)}$. Then, (y%4) is calculated for a given integer of y. Subsequently, the calculated value of (y%4) is used as an address to obtain a value of $g(y) = 2^{((y\%4)/4)}$ from the second table illustrated in FIG. 30. Then, a multiplier is used to calculate $f(x)*g(y)$ so as to obtain a multiplied value $f(x)*g(y) = h(x,y)$. Since the obtained value f(x) is within the range of $\pm 1$ while the obtained value g(y) is within the range of $\pm 2$, the multiplication result h(x,y) should always has a value in the range of $\pm 2$.

Then, h(x,y) is multiplied by $2^{\text{int}(y/4)}$ so as to obtain a multiplied value i(x,y) as a calculation result of Expression (2). The multiplication can be performed by a bit shift operation. In the bit shift operation, it is assumed that a limit operation (so called a "clipping operation") is performed when the final calculation result exceeds the range of ±2. Thus, in the prior art, the calculation $i(x,y)=x^{(4/3)}*2^{(y/4)}$ is performed using a large-capacity table.

Use of the above conventional method for obtaining a value of $x^{(a/b)}$ requires a large memory area for the table containing different values of $x^{(a/b)}$. For example, assuming that the stored values of $x^{(a/b)}$ are 32-bit fixed point values, the table illustrated in FIG. 27 would require a memory area of 32 K bytes. Thus, when x has a wide variable range, large-scale hardware has to be employed for the large memory area required.

Moreover, in the conventional method of calculating $x^{(a/b)}*2^{(y/c)}$, the number of significant digits of the calculated value f(x) is undesirably small for relatively small input integers of x, as those in the upper portion of FIG. 29. For example, the value f(x) corresponding to address x=2 uses only the lower 14 bits of the 32 bits that are available. Thus, a calculation performed by using such a table results in a poor accuracy in the calculation result. Moreover, the conventional calculation method employs a wide range of x (i.e., 0–8191), and accordingly requires a memory area as large as 8191*32 bits. Consequently, a conventional decoding device requires a table having a very large capacity.

SUMMARY OF THE INVENTION

According to one aspect of the invention, an exponential calculation device for calculating $x^{(a/b)}$ (where a and b are each an integer constant) for a given input value of x is provided. The device includes: an input control section for outputting a value of x', wherein x'=x when x≦A (where A is a threshold value within a variable range of x) and $x'=x/2^b$ when x>A; a core section for outputting a value of $z'=x'^{(a/b)}$; and an output control section for outputting a value of z, wherein z=z' when x≦A and $z=z'*2^a$ when x>A.

In one embodiment of the invention, the input control section calculates the value of x' by shifting x down by b bits when x>A.

In another embodiment of the invention, the core section stores in a table values of $x'^{(a/b)}$ for all possible values of x' (where 0≦x'≦A).

In still another embodiment of the invention, A is set to a value such that x is less than or equal to A at a frequency equal to or greater than a predetermined value.

According to another aspect of this invention, an exponential calculation device for calculating $x^{(a/b)}$ (where a and b are each an integer constant) for a given input value of x is provided. The device includes: an input control section for outputting a value of x', wherein x'=x when x≦A (where A is a threshold value within a variable range of x) and $x'=x/2^{(b*n)}$ when x>A (where n is an integer which satisfies $x/2^{(b*n)}≦A$); a core section for outputting a value of $z'=x'^{(a/b)}$; and an output control section for outputting a value of z, wherein z=z' when x≦A and $z=z'*2^{(a*n)}$ when x>A.

In one embodiment of the invention, the input control section calculates the value of x' by shifting x down by (b*n) bits when x>A.

In another embodiment of the invention, the core. section stores in a table values of $x'^{(a/b)}$ for all possible values of x' (where 0≦x'≦A).

In still another embodiment of the invention, A is set to a value such that x is less than or equal to A at a frequency equal to or greater than a predetermined value.

According to still another aspect of this invention, an exponential calculation device for calculating $x^{(a/b)}$ (where a and b are each an integer constant) for a given input value of x is provided. The device includes: an input control section for outputting a value of x', wherein x'=x when x≦A (where A is a threshold value within a variable range of x) and $x'=x/2^b$ when x>A; a core section for outputting a value of $z'=x'^{((a\%b)/b)}$; an output control section for outputting a value of z, wherein z=z' when x≦A and $z=z'*2^{(a\%b)}$ when x>A; and a multiplication section for outputting $z*(x^{(int(a/b))})$.

In one embodiment of the invention, A is set to a value such that x is less than or equal to A at a frequency equal to or greater than a predetermined value.

According to still another aspect of this invention, an exponential calculation device for calculating $x^{(a/b)}$ (where a and b are each an integer constant) for a given input value of x is provided. The device includes: a determination section for outputting a parameter j (j is an integer which is not negative) for specifying a value of x; an input control section for outputting a value of x', wherein x'=x when x≦A (where A is a threshold value within a variable range of x) and $x'=x/2^j$ when x>A; a core section for outputting a value of $z'=x'^{(a/b)}$; and an output control section for outputting a value of z, wherein z=z' when x≦A and $z=z'*2^{(j*a/b)}$ when x>A.

In one embodiment of the invention, the output control section includes a memory section for storing values of $2^{(j*a/b)}$ using j as an address; and the value of z is calculated by reading out a corresponding value of $2^{(j*a/b)}$ from the memory section when x>A.

In another embodiment of the invention, $A=2^B$ (B is an integer constant); and the determination section determines the value of j such that $2^{(B+(j-1))}≦x<2^{(B+j)}$ when $x>2^b$ and such that j=0 when $x≦2^b$.

According to still another aspect of this invention, an exponential calculation device for calculating $x^{(a/b)}$ (where a and b are each an integer constant) for a given input value of x is provided. The device includes: a determination section for outputting a value of k which denotes a number of digits of x represented in a binary form; an input control section for outputting a value of x', wherein the value of x' is obtained by shifting x up by (B-k) bits when the value of (B-k) is positive and by shifting x down by (k-B) bits when the value of (B-k) is negative; a core section for outputting a value of $z'=x'^{(a/b)}$; and an output control section for outputting a value of $z=z'*(2^{((k-B)*a/b)})$.

In one embodiment of the invention, the output control section includes a memory section for storing values of $2^{((k-B)*a/b)}$ using k as an address; and the value of z is calculated by reading out a corresponding value of $2^{((k-B)*a/b)}$ from the memory section.

In another embodiment of the invention, the core section includes a memory section for storing values of $q^{(a/b)}$ (where $2^{(B-1)}≦q<2^B$, and q is an integer) using at least lower (B-1) bits of q as an address; and the value of z' is calculated by reading out a corresponding value of $q^{(a/b)}$ from the memory section using the at least lower (B-1) bits of x' as an address.

According to still another aspect of this invention, there is provided a decoding device for extracting a variable quantization code x and a variable scaling factor y from an input bit stream containing the quantization code x and the scaling factory and calculating $x^{(a/b)}*2^{(y/c)}$ (where a, b and c are each an integer constant). The device includes: an isolation section for isolating x and y from the input bit stream; a first bit shift section for, when $x \leq 2^N$ (where N is a predetermined threshold value), shifting x by a number of bits according to N so as to convert x to x1 which is in a fixed point format; a first memory section for storing, for all possible values of q (where q is an integer such that $0 \leq q \leq 2^N$), using q as an address, values of H(q) which have been converted to a fixed point format by shifting $q^{((a-b)/b)}$ by a number of bits according to M (where M is an integer value of $(N*(a-b))/b$); a second memory section for storing, for all possible values of p (where $0 \leq p < c$), values of $G(p) = 2^{(p/c)}$ in a fixed point format; a division section for calculating y1, where y1=int(y/c); a modulo calculation section for calculating y2=y%c; a multiplication section for outputting a value obtained by multiplying together a value of H(x) which has been read out from the first memory section using x as an address, a value of G(y2) which has been read out from the second memory section using y2 as an address and a value of x1 which has been converted by the first bit shift section; and a second bit shift section for shifting the output value from the multiplication section by a number of bits according to y1 obtained by the division section.

In one embodiment of the invention, the number of bits according to N is (D−N) (where D is a number of significant digits of a fractional portion of a number involved in a fixed point calculation operation); and the number of bits according to y1 is (y1+(N+M)).

In another embodiment of the invention, M is an integer obtained by rounding up (N*(a−b))/b.

In still another embodiment of the invention, a=4, b=3 and c=4.

In still another embodiment of the invention, the device further includes: a determination section for outputting a determination result being true when $x \leq 2^N$ and being false when $x > 2^N$; and a second division section for outputting the value of x without alteration when the determination result is true and for outputting a value obtained by dividing x by $(2^{(b*i)})$. The first bit shift section shifts x by a number of bits according to (N+b*i) (where i is an integer which is not negative) when the determination result is false. The first memory section stores values of H(q) for values of q which are within the variable range of x. The second bit shift section shifts the value output from the multiplication section by a number of bits according to y1 when the determination result is true and by a number of bits according to y1 and a*i when the determination result is false.

In still another embodiment of the invention, the number of bits according to N is (D−N); the number of bits according to (N+b*i) is D−(N+b*i); the number of bits according to according to M is (D−M); the number of bits according to according to y1 is (y1+N+M); and the number of bits according to y1 and a*i is (y1+N+M+a*i).

In still another embodiment of the invention, the value of i is determined so that x satisfies $2^{(N+b(i-1))} < x \leq 2^{(N+bi)}$.

In still another embodiment of the invention, the device further includes a determination section for outputting a determination result being true when $x < 2^N$ and being false when $x > 2^N$, and further outputting a parameter i for specifying a value of x. The first bit shift section and the second division section and the second shifting section operate according to the determination result from the determination section.

In still another embodiment of the invention, the second bit shift section shifts the value output from the multiplication section by a number of bits according to y1 when the determination result is true and by a number of bits according to y1+(a*i) when the determination result is false.

According to still another aspect of this invention, there is provided a decoding device for extracting a variable quantization code x and a variable scaling factor y from an input bit stream containing the quantization code x and the scaling factor y and calculating $x^{(a/b)} * 2^{(y/c)}$ (where a, b and c are each an integer constant). The device includes: an isolation section for isolating x and y from the input bit stream; a determination section for outputting a determination result being true when $x \leq 2^N$ (where N is a predetermined threshold value) and being false when $x > 2^N$, and further outputting a parameter j for specifying a value of x; a first bit shift section for shifting x by a number of bits according to N when the determination result is true and by a number of bits according to (N+j) when the determination result is false so as to convert x to x1 which is in a fixed point format; a first division section for calculating y1, where y1=int(y/c); a second division section for outputting a value of x', wherein x'=x when the determination result is true and x' is an integer value of $(x/(2^j))$; a first memory section for storing, for all possible values of q (where q is an integer such that $0 \leq q \leq 2^N$) within a variable range of x', using q as an address, values of H(q) which have been converted to a fixed point format by shifting $q^{((a-b)/b)}$ by a number of bits according to M (where M is an integer value of $(N*(a-b))/b$); an adjustment coefficient generation section for generating values of I(p,j) in a fixed point format according to $2^{(p/c)} * 2^{(j/b)}$ for all possible values of p such that $0 \leq p < c$ and all possible values of j; a modulo calculation section for calculating y2=y%c; a multiplication section for outputting a value obtained by multiplying together a value of H(x') which has been read out from the first memory section using x' as an address, a value of I(y2,j) corresponding to y2 and j which has been generated by the adjustment coefficient generation section and a value of x1 which has been converted by the first bit shift section; and a second bit shift section for shifting the output value from the multiplication section by a number of bits according to y1 when $x \leq 2^N$ and by a number of bits according to y1 and j when $x > 2^N$.

In one embodiment of the invention, the adjustment coefficient generation section includes a second memory section for storing values of I(p,j) using p and j as an address.

In another embodiment of the invention, the value of j is determined so as to satisfy $2^{(N+(j-1))} < x \leq 2^{(N+j)}$ when $x > 2^N$, whereas j=0 when $x \leq 2^N$.

In still another embodiment of the invention, a=4, b=3 and c=4.

According to still another aspect of this invention, there is provided a decoding device for extracting a variable quantization code x and a variable scaling factor y from an input bit stream containing the quantization code x and the scaling factor y and calculating $x^{(a/b)} * 2^{(y/c)}$ (where a, b and c are each an integer constant). The device includes: an isolation section for isolating x and y from the input bit stream; a determination section for determining a number k of digits of x represented in a binary form; a second division section for outputting a value of x', wherein the value of x' is obtained by shifting x up by (N−k) bits when the value of (N−k) is positive and by shifting x down by (k−N) bits when the value of (N−k) is negative; a first bit shift section for shifting x by a number of bits according to k so as to convert x to x1 which is in a fixed point format; a first division section for calculating y1, where y1=int(y/c); a first memory section for storing, using at least lower (N−1) bits of q (where q is an integer such that $2^{(N-1)} \leq q < 2^N$) as an address, values of H(q) which have been converted to a fixed point format by shifting $q^{((a-b)/b)}$ by a number of bits according to M (where M is an integer value of $(N*(a-b))/$ b); an adjustment coefficient generation section for generating values of I(p,k) in a fixed point format according to $2^{\wedge}(p/c)*2^{\wedge}((k-N)/b)$ for all possible values of p such that $0 \leq p < c$ and all possible values of k; a modulo calculation section for calculating y2=y%c; a multiplication section for outputting a value obtained by multiplying together a value of H(x') which has been read out from the first memory section using the at least lower (N−1) bits of x' as an address, a value of I(y2,k) corresponding to y2 and k which has been generated by the adjustment coefficient generation section and a value of x1 which has been converted by the first bit shift section; and a second bit shift section for shifting the output value from the multiplication section by a number of bits according to y1, M and k.

In one embodiment of the invention, the adjustment coefficient generation section includes a second memory section for storing values of I(p,k) using p and k as an address.

In another embodiment of the invention, a=4, b=3 and c=4.

Thus, the invention described herein makes possible the advantages of: (1) reducing the hardware scale of an exponential calculation device which Is capable of calculating x^(a/b) for a given value of x, by reducing the memory area to be used for a table; (2) realizing a decoding device capable of calculating x^(a/b)*2^(y/c) with a high accuracy using a fixed-point-format processing unit even when the integer x is considerably smaller than the maximum value of the variable range thereof; (3) realizing a decoding device which only has a table for relatively small integers x and still Is capable of calculating x^(a/b)*2^(y/c) even for a large value of x by using the small-capacity table; and (4) realizing a calculation method capable of a calculation involving a large value of x using a small-capacity table by the use of a simple bit shift operation, thereby realizing a decoding device capable of rapidly calculating x^(a/b)*2^(y/c) for any given values of x and y.

These and other advantages of the present invention will become apparent to those skilled in the art upon reading and understanding the following detailed description with reference to the accompanying figures.

BRIEF DESCRIPTION OF THE DRAWINGS

FIG. 3 illustrates the contents of a ROM Table 1 of a core section 11A of the exponential calculation device 100;

FIG. 5 illustrates the contents of a ROM Table 2 of the core section 11B of the exponential calculation device 100;

FIG. 8 illustrates the contents of a ROM Table 3 of a core section 21 of the exponential calculation device 200;

FIG. 11 illustrates a table for providing a value of $2^{\wedge}(j/3)$ in an output control section 32 of the exponential calculation device 300;

FIG. 14 illustrates the contents of a ROM Table 4 of a core section 41 of the exponential calculation device 400;

FIG. 15 illustrates a table for providing a value of $2^{\wedge}((k-B)/3)$ in an output control section 42 of the exponential calculation device 400;

FIG. 17 illustrates the contents of a first memory section 52 of the decoding device 500;

FIG. 18 illustrates the contents of a second memory section 53 of the decoding device 500 and a second memory section 64 of a decoding device 600;

FIG. 20 illustrates the contents of a first memory section 63 of the decoding device 600 and a first memory section 73 of a decoding device 700;

FIG. 23 illustrates the contents of an adjustment coefficient generation section 74 of the decoding device 700;

FIG. 25 illustrates the contents of an adjustment coefficient generation section 84 of the decoding device 800;

FIG. 26 illustrates the contents of a first memory section 83 of the decoding device 800;

FIG. 27 illustrates table of values of x^(4/3) for $0 \leq x \leq 8191$ which is provided in a conventional exponential calculation device;

FIG. 29 illustrates the contents of a first table used in a conventional decoding device; and FIG. 30 illustrates the contents of a second table used in the conventional decoding device.

The entire disclosure of U.S. patent application Ser. No. 09/244,155, filed Feb. 3, 1999, is expressly incorporated by reference herein.

DESCRIPTION OF THE PREFERRED EMBODIMENTS

The principle of the present invention will first be described. An exponential calculation device of the present invention only requires a table containing values of x^(a/b) for input values of x less than or equal to a predetermined value A, and still is capable of obtaining a value of x^(a/b) for any input value of x. The present invention does not require a large table for storing values of x^(a/b) for input values of x greater than A, and accordingly requires a memory area much smaller than that of the conventional exponential calculation device which requires a large table for storing values of x^(a/b) for all the possible input values of x.

The basic principle of operation of the exponential calculation device of the present invention will now be described based on arithmetic expressions. Assuming the input value to the exponential calculation device is x and the value to be obtained is z=x^(a/b), where the input value x represents an amplitude of a signal used in decoding audio data, for example, and A denotes a threshold value of the variable range of x.

When x≦A, the value of x^(a/b) for the input value of x is already provided in a table, whereby the value of x^(a/b) can easily be obtained or retrieved from the table.

When x>A, x is first divided by a predetermined value to obtain x' such that x'≦A. A value x'^(a/b) is read out from the table and is multiplied by the predetermined value so as to obtain the value of x^(a/b) for the given value of x. In this way, a value of x^(a/b) for any given value of x can be obtained. For example, when a=4 and b=3, and when x is in the range of 8*A≧x>A, x' is first obtained as x'=x/8. Then, a corresponding value is read out from the table for the value of x', thereby obtaining z'. Since z'=(x/8)^(4/3), the value of z=x^(4/3) can be obtained as z'*(8^(4/3))=z'*16.

EXAMPLE 1

An exponential calculation device according to Example 1 of the present invention will now be described with reference to the figures. The exponential calculation device of this example performs an exponential calculation x^(4/3). In this example, the range of the input value of x is 0–8191. The range of the exponentiated value x^(4/3) and the range of the input value of x conform to the MPEG 2 audio AAC standard (see ISO/IEC 13818–7:1997, P57).

Figure 1:
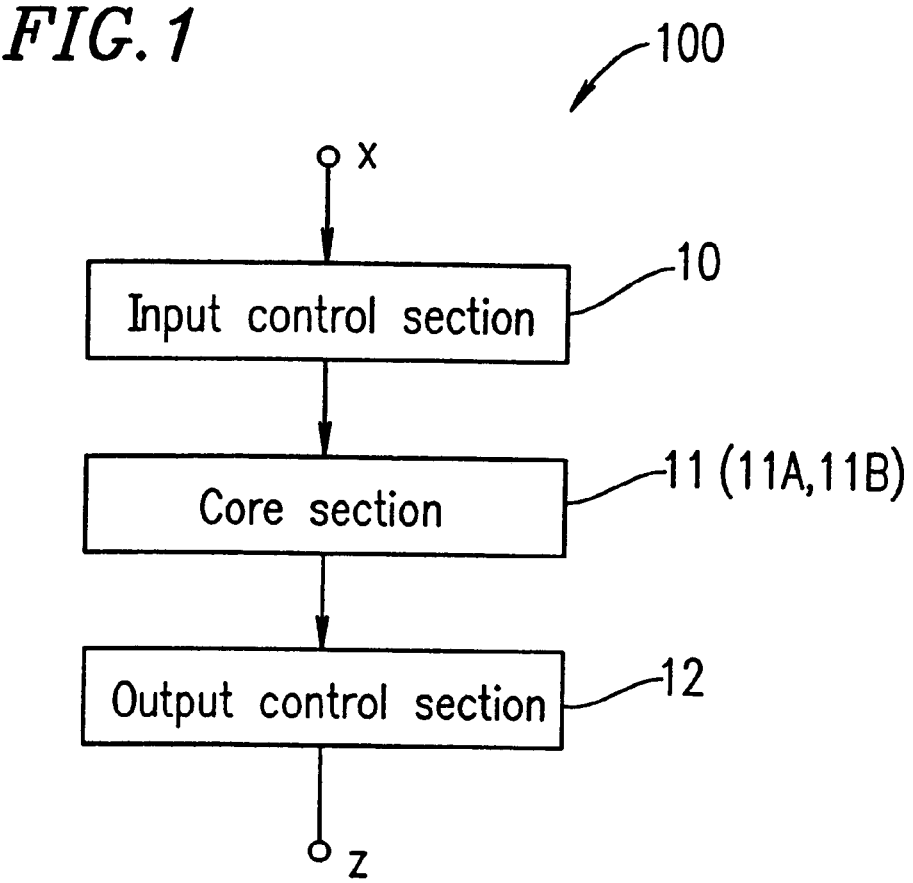
FIG. 1 is a block diagram illustrating a structure of an exponential calculation device 100 according to Example 1 of the present invention.

FIG. 1 is a block diagram illustrating a structure of an exponential calculation device 100 according to Example 1 of the present invention. The exponential calculation device 100 includes an input control section 10, a core section 11 and an output control section 12.

Figure 2:
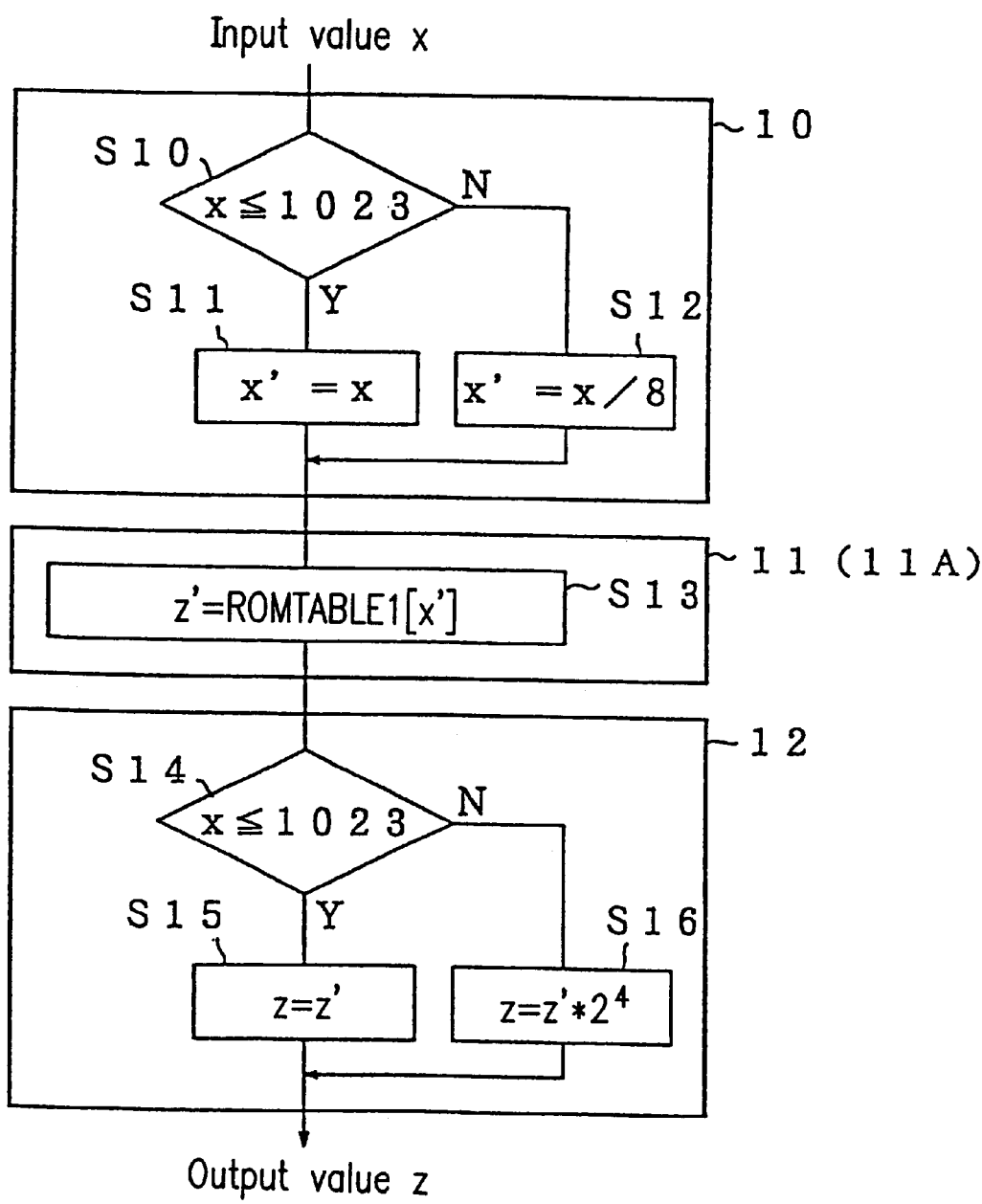
FIG. 2 is a flow chart illustrating a signal processing method for the exponential calculation device 100.

FIG. 2 is a flow chart illustrating signal processing performed by the exponential calculation device 100, showing respective signal processing steps performed by the input control section 10, the core section 11 and the output control section 12. Referring to FIG. 2, the respective components of the exponential calculation device 100 will now be described in detail.

The input control section 10 determines if the input value of x is less than or equal to a threshold value A (e.g., 1023 in this example). If the input value of x is less than or equal to 1023, the input control section 10 provides the value of x, without alteration, as x' to the core section 11. If the input value of x exceeds 1023, the input control section 10 provides a value obtained by dividing x by 2^3 as x' to the core section 11.

The core section 11 provides the value of x'^(4/3) for the value of x', which is in the range from 0 to 1023. The core section 11 illustrated in FIG. 2 is one example of the core section 11 and will hereinbelow be referred to as the "core section 11A". The core section 11A has a ROM Table 1 (z'=ROMTABLE1[x']). The core section 11A outputs a value read out from the ROM Table 1 for the value of x' as z'.

FIG. 3 illustrates the contents of the ROM Table 1 of the core section 11A. The ROM Table 1 contains values of x'^(4/3) which have been calculated for value of x' in the range from 0 to 1023.

The output control section 12 provides the output value z' from the core section 11A, without alteration, as z when the input value of x is less than or equal to 1023, and provides a value obtained by multiplying the output value from core section 11A by 2^4 as z when x exceeds 1023.

An operation of the exponential calculation device 100 having such a structure will now be described. First, step S10 determines if a given value of x is less than or equal to 1023. When x does not exceed 1023, the process proceeds to step S11, thereby providing the value of x, without alteration, as x' to the core section 11A. If it is determined that x exceeds 1023, the process proceeds to step S12 so as to provide x' by dividing x by 2^3 to the core section 11A. The division of x by 2^3 can be performed, for example, by shifting x down by 3 bits or by first adding 4 to x and then shifting down the obtained value by 3 bits for a "0-down-1-up" round-off process, where 0.0's are rounded down and 0.1's are rounded up.

Next, in step S13, the core section 11A reads out from the ROM Table 1, as illustrated in FIG. 3, a value of x'^(4/3) for the value of x' provided by the input control section 10.

Figure 4:
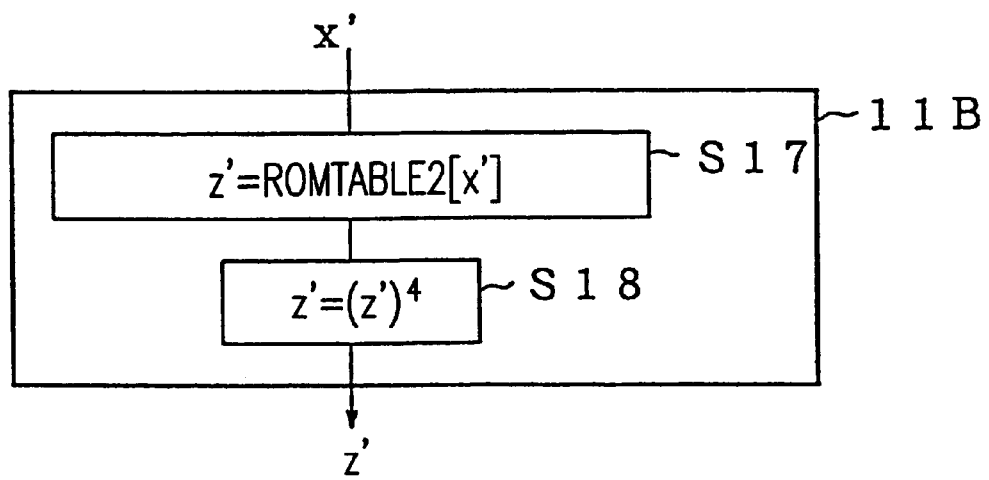
FIG. 4 is a flow chart illustrating a signal processing method for another core section 11B of the exponential calculation device 100.

FIG. 4 is a flow chart illustrating a signal processing procedure performed by another exemplary core section 11B for use with the exponential calculation device 100. The core sections 11A and 11B, as illustrated in FIGS. 2 and 4, respectively, may be used inter-changeably in the present invention. The core section 11B stores in a ROM Table 2 values of x^(L/b) for values of x' from 0 to the threshold value A, wherein L=a/m (where m is a positive constant). The core section 11B raises z' (from the ROM Table 2) to the power of m, and outputs the resulting value as new z'.

FIG. 5 illustrates the contents of the ROM Table 2 of the core section 11B. The core section 11B uses the ROM Table 2 (z'=ROMTABLE2[x']) which stores values of x'^(L/b) for m=4 and L=1 (i.e., x'^(1/3)) for values of x' in the range from 0 to 1023. Referring to FIG. 4, in step S17, z' is read out from the ROM Table 2 and, in step S18, z' is raised to the power of 4, thereby obtaining the value of x' (4/3). Such an additional exponential calculation as is required in this core section 11B can easily be processed by a multiplier of a DSP, thereby maintaining a small capacity of the ROM table.

Referring back to FIG. 2, in step S14, the output control section 12 determines if the input value of x is less than or equal to 1023. When x is less than or equal to 1023, the process proceeds to step S15, thereby outputting the output value from the core section 11, without alteration. When it is determined that the input value of x exceeds 1023 in step S14, the process proceeds to step S16, thereby outputting a value obtained by multiplying the output value from the core section 11 by 2^4.

As described above, the present invention does not require providing values of x^(a/b) for all the possible values of x contemplated (e.g., 0–8191 in this example), but only requires providing values of x^(a/b) for input values of x less than or equal to the predetermined threshold value A=1023. In this way, values of x^(a/b) for input values of x exceeding A can also be approximately calculated. Thus, it is possible to effect an exponential calculation with small-scale hardware.

Herein, 1023 is selected as the threshold value A for the following reasons. Under the MPEG 2 audio AAC standard, the input value of x^(4/3) can range from 0 to 8191. In fact, however, values from 0 to 1023 are involved in most cases. Therefore, for x ranging from 0 to 1023, the calculation $x^{\wedge}(4/3)$ should accurately be performed so as not to deteriorate the sound quality. However, for x of 1024 or greater, since x rarely takes such a large value, the sound quality would not significantly deteriorate even if the calculation is not as accurate as that for x ranging from 0 to 1023. Accordingly, for x exceeding 1023, an approximate calculation can be performed according to the method of the present example.

Among the values from 0 to 1023, actual calculations particularly involve, in most cases, values from 0 to 255. Accordingly, the statistic threshold value A may be set to 255. The following example of the invention will discuss an example where the statistic threshold value is set to 255.

EXAMPLE 2

Example 2 of the present invention will now be described with reference to the figures. This example provides an exponential calculation device for obtaining a value of $x^{\wedge}(4/3)$, as an exemplary exponentiated value $x^{\wedge}(a/b)$. The exponential calculation device of the present example can be characterized in that it performs the exponential calculation $x^{\wedge}(a/b)$ by performing two exponential calculations for an integral portion of a/b and for a fractional portion thereof (where a and b are each an integer, and a>b). The exponential calculation for the integral portion of a/b can therefore be expressed as $x^{\wedge}(int(a/b))$, whereas the exponential calculation for the fractional portion of a/b can be expressed as $x^{\wedge}((a\%b)/b)$. The symbol "int()" as used herein denotes a round-down operation, where any fractional portion of the number is cut off, and the symbol "%" as used herein denotes a modulo operation for obtaining a remainder (integer) of a division.

As in Example 1, the range of input values of x is from 0 to 8191, conforming to the MPEG 2 audio AAC standard (see ISO/IEC 13818-7:1997, P57).

Figure 6:
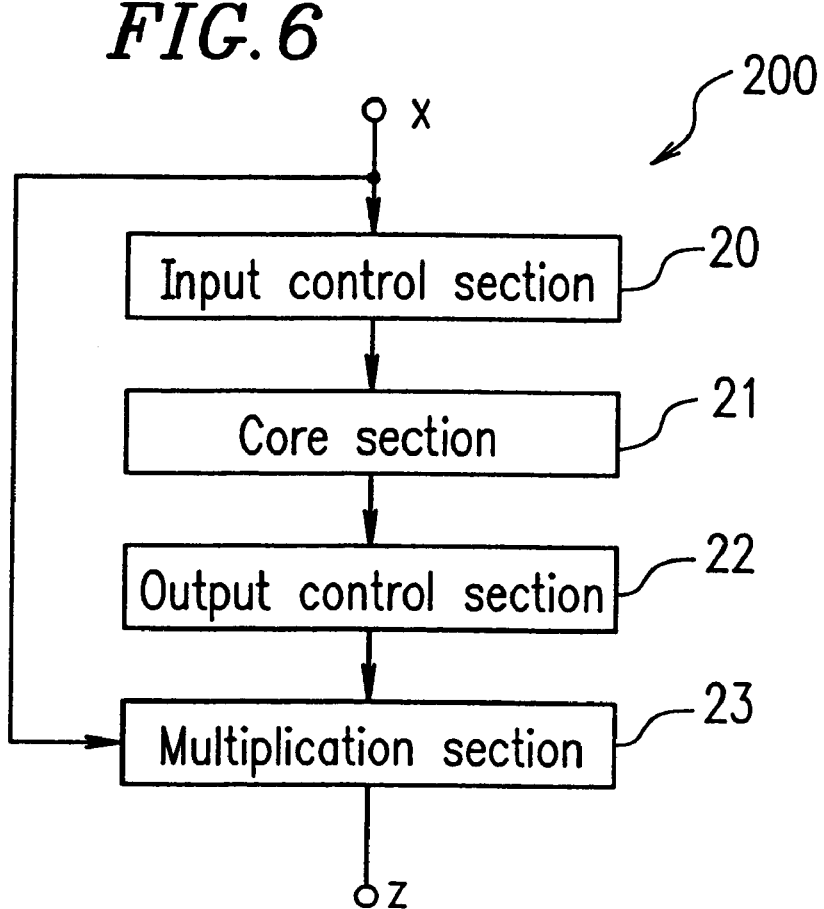
FIG. 6 is a block diagram illustrating a structure of an exponential calculation device 200 according to Example 2 of the present invention.

FIG. 6 is a block diagram illustrating a structure of an exponential calculation device 200 according to Example 2 of the present invention. The exponential calculation device 200 includes an input control section 20, a core section 21, an output control section 22 and a multiplication section 23.

Figure 7:
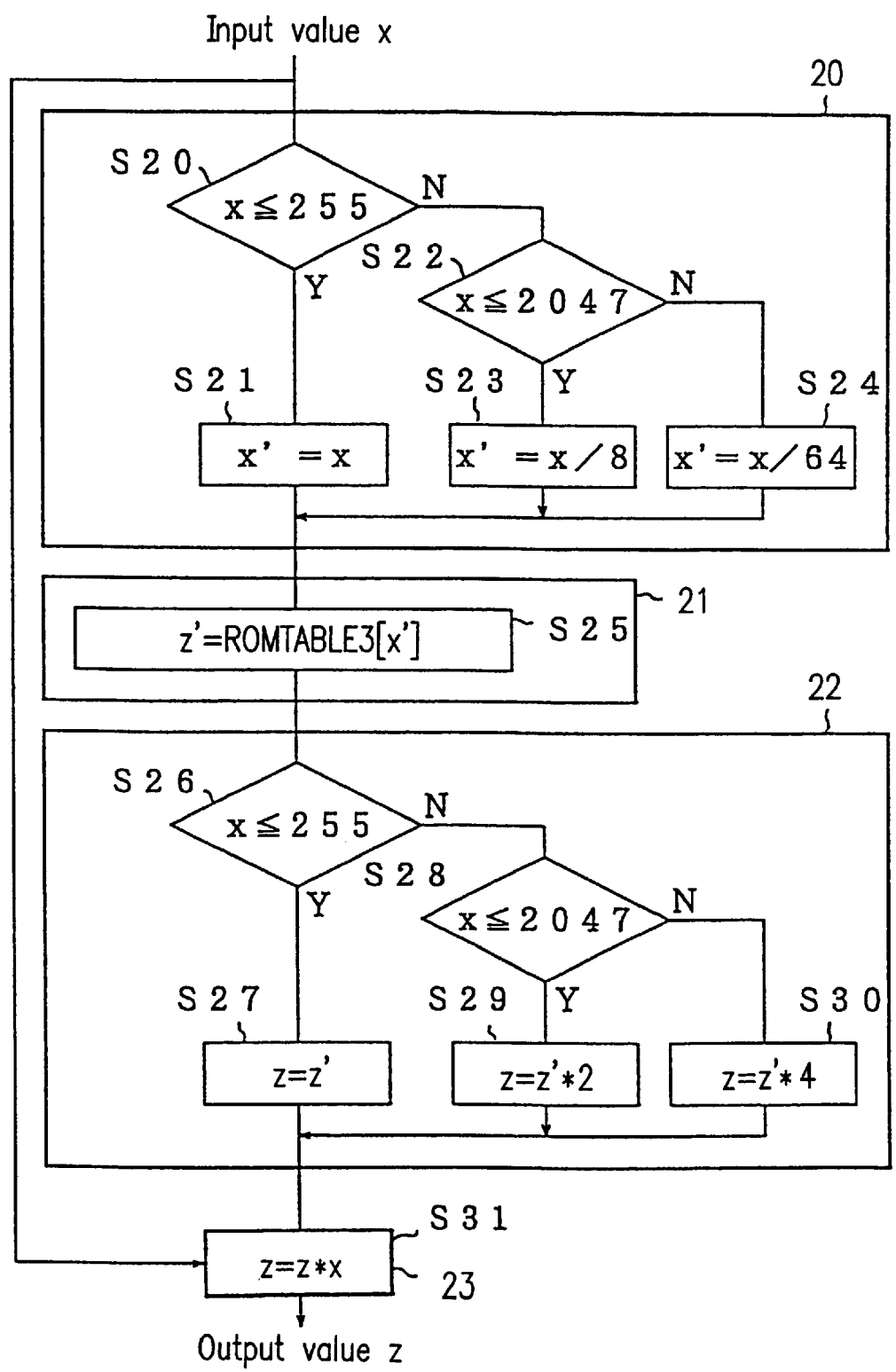
FIG. 7 is a flow chart illustrating a signal processing method for the exponential calculation device 200.

FIG. 7 is a flow chart illustrating a signal processing method of the exponential calculation device 200, showing the respective signal processing procedures performed by the input control section 20, the core section 21, the output control section 22 and the multiplication section 23.

When the input value of x is less than or equal to 255 (first threshold value A1), the input control section 20 provides the value of x, without alteration, to the core section 21 as x'. When the input value of x exceeds 255 but is less than or equal to 2047 (second threshold value A2), the input control section 20 provides a value obtained by dividing x by 2^3 to the core section 21 as x'. When the input value of x is equal to or grater than 2048, the input control section 20 provides a value obtained by dividing x by 2^6 to the core section 21 as x'.

FIG. 8 illustrates the contents of a ROM Table 3 of the exponential calculation device 200. The core section 21 has the ROM Table 3, as illustrated in FIG. 8, and provides values of $x'^{\wedge}((a\%b)/b)$ (i.e., $x'^{\wedge}(1/3)$) for values of x' from 0 to 255. The values of $x'^{\wedge}(1/3)$ for values of x' from 0 to 255 are stored in the ROM Table 3 in advance.

When the input value of x is less than or equal to the first threshold value A1, the output control section 22 outputs the output value from the core section 21, without alteration. When the input value of x exceeds the first threshold value A1 but less than or equal to the second threshold value A2, the output control section 22 outputs a value obtained by multiplying the output value z' from the core section 21 by $2^{\wedge}(a\%b)$ as z. When the input value of x exceeds the second threshold value A2, the output control section 22 outputs a value obtained by multiplying the output value from the core section 21 by $2^{\wedge}((a\%b)*2)$. The multiplication section 23 multiplies $x^{\wedge}(int\ (a/b))$ with the output value z from the output control section 22 so as to output the multiplied value as a new value of z.

An operation of the exponential calculation device 200 of Example 2 having such a structure will now be described. Referring to FIG. 7, in step S20, the input control section 20 determines if the input value of x is less than or equal to the first threshold value, 255. When the input value of x is less than or equal to 255, the process proceeds to step S21, thereby providing the value x, without alteration, to the core section 21 as x'. If it is determined in step S20 that the input value of x is equal to or greater than 256, the process proceeds to step S22, where it is determined if the input value of x is less than or equal to the second threshold value A2, 2047. When x is less than or equal to 2047, the process proceeds to step S23, where a value obtained by dividing x by 2^3 is provided to the core section 21 as x'. When it is determined in step S22 that the input value of x is equal to or greater than 2048, the process proceeds to step S24, where a value obtained by dividing x by 2^6 is provided to the core section 21 as x'.

The division of x by 2^3 can be performed, for example, by shifting x down by 3 bits or by first adding 4 to x and then shifting down the obtained value by 3 bits for the "0-down-1-up" round-off process. The division of x by 2^6 can be performed, for example, by shifting x down by 6 bits or by first adding 32 to x and then shifting down the obtained value by 6 bits for the "0-down-1-up" round-off process.

Then, in step S25, the core section 21 reads out a value of $x'^{\wedge}(1/3)$ from the ROM Table 3, as illustrated in FIG. 8, for a value of x' provided by the input control section 20.

Then, in step S26, the output control section 22 determines if the input value of x is less than or equal to 255. If x is less than or equal to 255, the process proceeds to step S27, thereby outputting the output value from the core section 21, without alteration. When it is determined in step S26 that the input value of x is equal to or greater than 256, the process proceeds to step S28. Step S28 determines if the input value of x is less than or equal to 2047. If x is less than or equal to 2047, the process proceeds to step S29. If x is equal to or greater than 2048, the process proceeds to step S30. Step S29 outputs a value obtained by multiplying the output value from the core section 21 by 2^1, and Step S30 outputs a value obtained by, multiplying the output value from the core section 21 by 2^2.

Finally, instep S31, the multiplication section 23 multiplies the input value of x with the output value from the output control section 22. In this instance, the value to be obtained is $x^{\wedge}(4/3)$, and the output value from the output control section 22 is $x^{\wedge}(1/3)$. Therefore, $x^{\wedge}(4/3)$ is calculated by multiplying the original value of x with $x^{\wedge}(1/3)$.

As described above, in the present example, an exponential calculation device for calculating $x^{\wedge}(a/b)$ (where a>b) for an input value of x includes a core section for providing values of $x'^{\wedge}((a\%b)/b)$ for values of x' from 0 to A. Moreover, the exponential calculation device of the present invention is provided with a multiplication section for multiplying a value of $x^{\wedge}(int\ (a/b))$, for an input value of x, with an output value from the output control section.

Thus, it is not required to store values of $x^{\wedge}(a/b)$ for all the possible input values of x contemplated (0 to 8191 in this example), but it is only required to store values of $x^{((a\%b)/b)}$ for input values of x less than or equal to the predetermined value A (255 in this example). In this way, it is possible to exponentiate any value of x. Thus, it is possible to perform, using small-scale hardware, an exponential calculation with a fractional exponent.

EXAMPLE 3

An exponential calculation device according to Example 3 of the present invention will now be described with reference to the figures. This example provides an exponential calculation device for obtaining a value of $x^{(1/3)}$, as an exemplary exponentiated value $x^{(a/b)}$. The input value of x is assumed to range from 0 to 8191.

Figure 9:
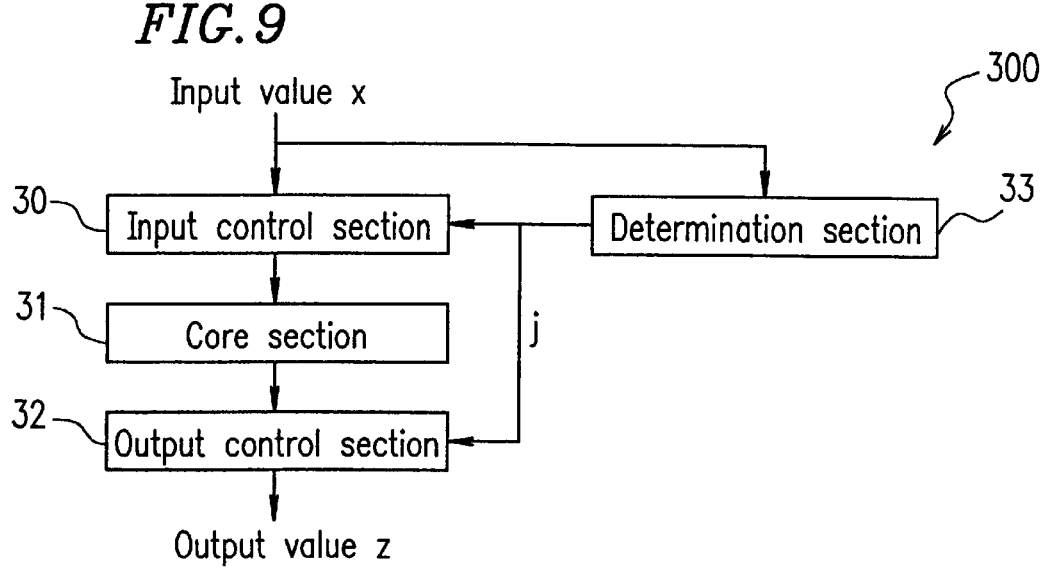
FIG. 9 is a block diagram illustrating a structure of an exponential calculation device 300 according to Example 3 of the present invention.

FIG. 9 is a block diagram illustrating a structure of an exponential calculation device 300 according to Example 3 of the present invention. The exponential calculation device 300 includes an input control section 30, a core section 31, an output control section 32 and a determination section 33.

Figure 10:
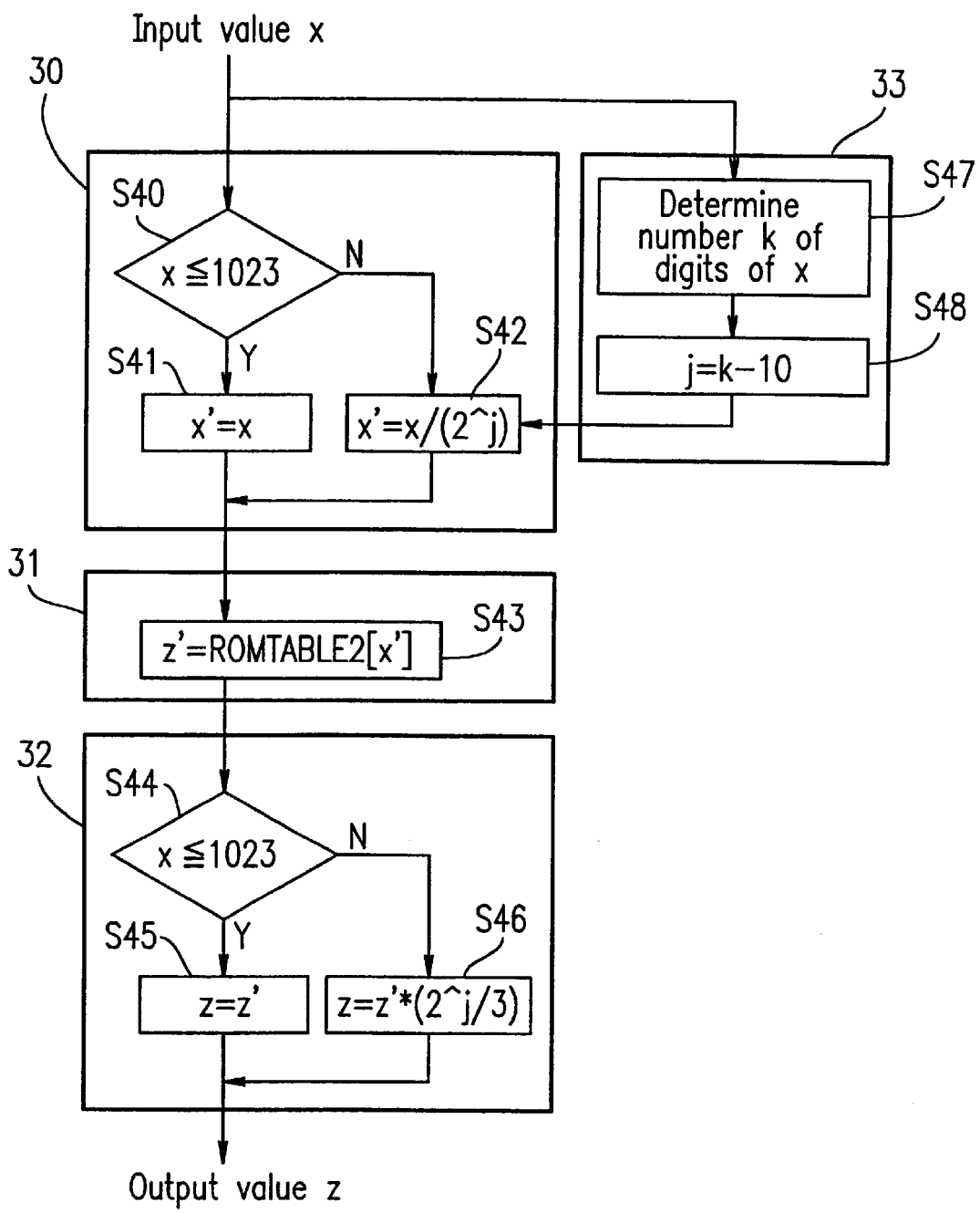
FIG. 10 is a flow chart illustrating a signal processing method for the exponential calculation device 300.

FIG. 10 is a flow chart illustrating a signal processing method of the exponential calculation device 300, showing the respective signal processing procedures performed by the input control section 30, the core section 31, the output control section 32 and the determination section 33.

The input control section 30 determines if the input value of x is less than or equal to the threshold value A (e.g., 1023 in this example). If x is less than or equal to 1023, the input control section 30 provides the value of x, without alteration, to the core section 31 as x'. If x is greater than 1023, the input control section 30 provides a value obtained by dividing x by $2^j$ to the core section 31 as x'.

The value of j is determined by the determination section 33 as follows. The determination section 33 first determines the number k of digits of x represented in a binary form, and then determines the value of j such that j=k−10. For example, when the input value of x is equal to or greater than 1024 and less than 2048, the value of j is 1. The value "10" is the number of digits of a value 1024 represented in the binary form. Accordingly, the value of j represents by how many digits x is greater than the threshold value A in the binary form.

As the core section 11B of Example 1, the core section 31 includes a ROM Table 2, as illustrated in FIG. 5. Values of $x'^{(1/3)}$ for x' from 0 to 1023 have been calculated and stored in the ROM Table 2. The core section 31 provides values of $x'^{(1/3)}$ for x' from 0 to 1023. When the input value of x is less than or equal to 1023, the output control section 32 outputs the value of z' from the core section 31, without alteration, as z. When the input value of x is greater than 1023, the output control section 32 outputs a value obtained by multiplying the value of z' output from the core section 31 by $2^{(j/3)}$, as z.

An operation of the exponential calculation device having such a structure will be described with reference to FIG. 10. The input control section 30 of FIG. 10 first receives an input value of x and determines, in step S40, if the value of x is less than or equal to 1023. When x is less than or equal to 1023, the process proceeds to step S41, whereby the value of x is provided, without alteration, to the core section 31 as x'. When it is determined in step S40, that the input value of x is greater than 1023, the process proceeds to step S42, a value obtained by dividing x by $2^j$ is provided to the core section 31 as x.

The value of j is determined by the determination section 33 as follows. In particular, the determination section 33 first determines the number k of digits of x represented in the binary form in step S47. Then, j=k−10 is obtained in step S48.

The division of x by $2^j$ can be performed, for example, by shifting x down by j bits or by first adding $2^{(j-1)}$ to x and then shifting down the obtained value by j bits for the "0-down-1-up" round-off process.

Next, instep S43, the core section 31 reads out the value of $x'^{(1/3)}$ from the ROM Table 2 in FIG. 5 for the value of x' provided from the input control section 30.

Finally, instep S44, the output control section 32 determines if the input value of x is less than or equal to 1023. When x is less than or equal to 1023, the process proceeds to step S45, whereby the output value from the core section 31 is output, without alteration. When it is determined in step S44 that the input value of x is greater than 1023, the process proceeds to step S46, thereby outputting a value obtained by multiplying the output value from the core section 31 by $2^{(j/3)}$.

FIG. 11 illustrates a table for providing a value of 2 (j/3) in an output control section 32 of the exponential calculation device 300. Values of $2^{(j/3)}$ can be stored in advance in a table using j as an address, so that a value of $2^{(j/3)}$ for a given value of j can be obtained by reading out the value from the table. The multiplication of the output value from the core section 31 by $2^{(j/3)}$ can be performed using an ordinary multiplier.

As described above, the present example does not require providing values of $x^{(1/3)}$ for all the possible values of x contemplated (e.g., 0–8191 in this example), but only requires providing values of $x^{(1/3)}$ for input values of x less than or equal to the predetermined threshold value A=1023. In this way, values of $x^{(1/3)}$ for input values of x exceeding A can also be approximately calculated. Thus, it is possible to perform an exponential calculation with small-scale hardware.

Even when x exceeds the threshold value A, the loss of bits can be minimized, so that the approximate value can be obtained with a high accuracy.

In the present example, the threshold value A is set to 1023, the highest possible value represented by 10 bits, and the determination section 33 is constructed so as to output a value which indicates by how many bits the number of bits of x is greater than 10 bits. However, the present invention is not limited to such a structure. Alternatively, when the use of an even smaller memory area is desired, for example, the threshold value A can be set to 255, the highest possible value represented by 8 bits, and the determination section 33 can be constructed accordingly so as to output a value which indicates by how many bits the number of bits of x is greater than 8 bits. Conversely, when a higher calculation accuracy is desired, the threshold value A can be set to 4095, the highest possible value represented by 12 bits, and the determination section 33 can be constructed accordingly so as to output a value which indicates by how many bits the number of bits of x is greater than 12 bits.

EXAMPLE 4

An exponential calculation device according to Example 4 of the present invention will now be described with reference to the figures. This example provides an exponential calculation device for obtaining a value of $x^{(1/3)}$, as an exemplary exponentiated value $x^{(a/b)}$. The input value of x is assumed to range from 0 to 8191.

Figure 12:
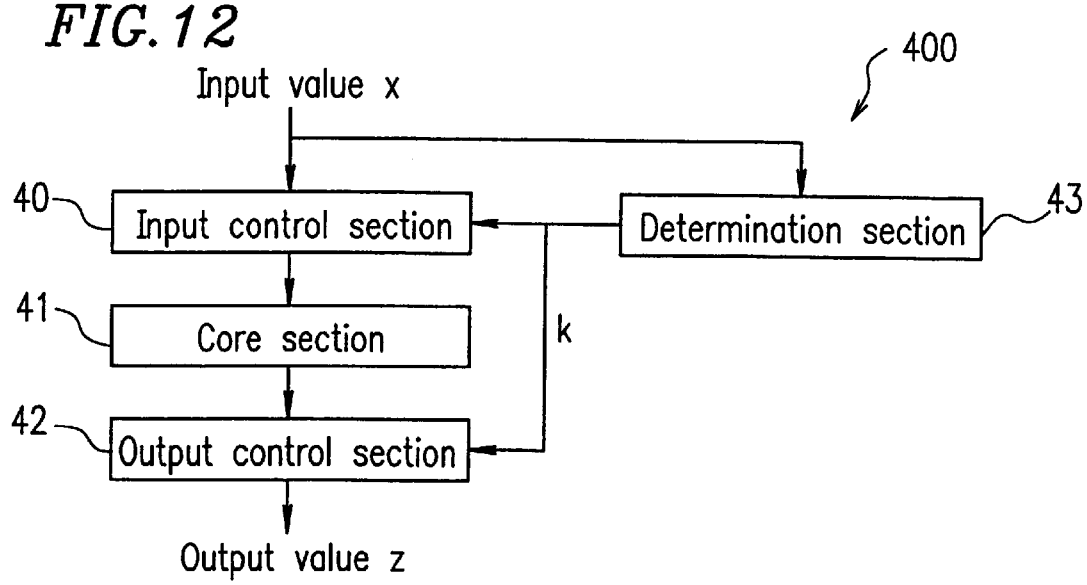
FIG. 12 is a block diagram illustrating a structure of an exponential calculation device 400 according to Example 4 of the present invention.

FIG. 12 is a block diagram illustrating a structure of an exponential calculation device 400 according to Example 4 of the present invention. The exponential calculation device 400 includes an input control section 40, a core section 41, an output control section 42 and a determination section 43.

Figure 13:
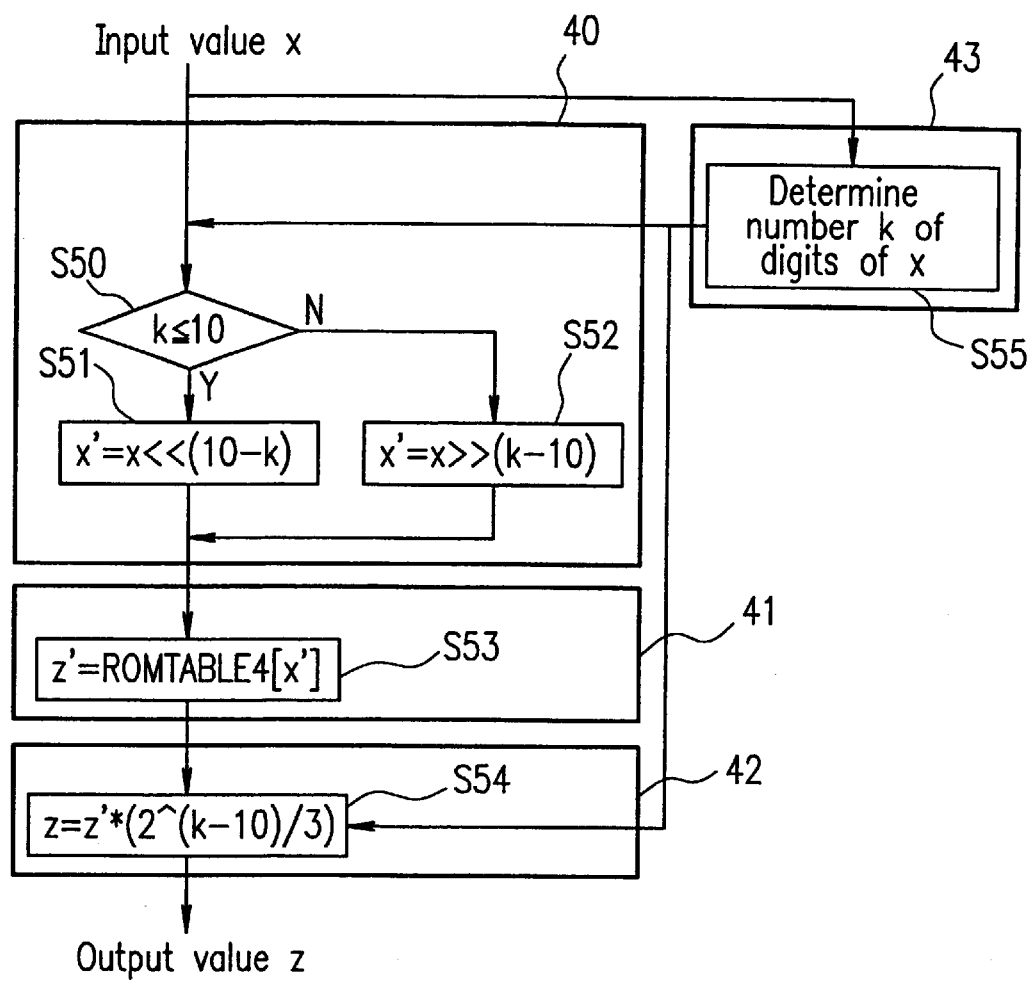
FIG. 13 is a flow chart illustrating a signal processing method for the exponential calculation device 400.

FIG. 13 is a flow chart illustrating a signal processing method of the exponential calculation device 400, showing the respective signal processing procedures performed by the input control section 40, the core section 41, the output control section 42 and the determination section 43.

The determination section 43 determines the number k of digits of x represented in the binary form. The input control section 40 determines if k is less than or equal to a threshold value B (e.g., 10 in this example). When x is less than or equal to 10, the input control section 40 provides to the core section 41 a value obtained by shifting x up by (B−k) bits as x'. When x is greater than 10, the input control section 40 provides to the core section 41 a value obtained by shifting x down by (k−B) bits as x'.

The core section 41 has a ROM Table 4 (z'= ROMTABLE4[x']) and provides values of x'^(1/3) for values of x' ranging from $2^{(B-1)}$ to $2^B-1$ (from 512 to 1023 in this example). The output control section 42 outputs a value obtained by multiplying z' output from the core section 41 by $2^{((k-B)/3)}$.

FIG. 14 illustrates the contents of a ROM Table 4 of a core section 41 of the exponential calculation device 400. Values of x'^(1/3) for values of x' from 512 to 1023 are stored in the ROM Table 4 in advance.

Note that, referring to FIG. 14, a value of x'^(1/3) for x'=512 (=$2^{(B-1)}$) is stored at address 0, and a value of x'^(1/3) for x'=1023 (=$2^B-1$) is stored at address 511. The table contains such values for the following reason. Where k denotes the number of bits of x represented in the binary form, the input control section 40 calculates x' by shifting x up by (B−k) bits when B−k is positive and by shifting x down by (k−B) bits when B−k is negative, whereby the $B^{th}$ bit of x' is always 1. Thus, the value is always in the range from $2^{(B-1)}$ to $2^B-1$. Therefore, the table of FIG. 14 can be referenced using only the lower (B−1) bits of x' as an address. As a result, the size of the table can be reduced to half.

An operation of the exponential calculation device having such a structure will be described with reference to FIG. 13. The determination section 43 of FIG. 12 first determines the number k of digits of x represented in the binary form in step S55. The input control section 40 receives the input value of x, and determines, in step S50, if k is less than or equal to B (B=10 in this example). When k is less than or equal to 10, the process proceeds to step S51, thereby providing to the core section 41 a value obtained by shifting x up by (B−k) bits as x'. When k is greater than 10, the process proceeds to step S52, thereby providing to the core section 41 a value obtained by shifting x down by (k−B) bits.

Then, in step S53, the core section 41 reads out from the ROM Table 4 of FIG. 14 a value of x'^(1/3) for the value of x' provided from the input control section 40. As described above, a value of x'^(1/3) for x'=512 (=$2^{(B-1)}$) is stored at address 0, and a value of x'^(1/3) for x'=1023 (=$2^B-1$) is stored at address 512. Therefore, only the lower (B−1) bits are used as an address for referencing the table of FIG. 14.

Finally, in step S54, the output control section 42 of FIG. 12 outputs a value obtained by multiplying the output value from the core section 41 by $2^{((k-B)/3)}$.

FIG. 15 illustrates a table for providing a value of $2^{((k-B)/3)}$ in an output control section 42 of the exponential calculation device 400. Values of $2^{((k-B)/3)}$ can be stored in advance in a table using k as an address, so that a value of $2^{((k-B)/3)}$ for a given value of k can be obtained by reading out the value from the table. The multiplication of the output value from the core section 41 by $2^{((k-B)/3)}$ can be performed using an ordinary multiplier.

As described above, the present example does not require providing values of x^(1/3) for all the possible values of x contemplated (e.g., 0–8191 in this example), but only requires providing values of x'^(1/3) for input values of x less than or equal to the predetermined threshold value B (e.g., 10 in this example). In this way, values of x^(1/3) for input values of x which has more than B bits can also be approximately calculated. Thus, it is possible to perform an exponential calculation with small-scale hardware.

Even when x has more than B bits, the loss of bits can be minimized, so that the approximate value can be obtained with a high accuracy.

Particularly, the present example provides an advantage that the size of the table can be reduced to half while maintaining substantially the same level of accuracy as that in Example 3 in calculating x^(1/3) for x having more than B bits.

EXAMPLE 5

A decoding-device according to Example 5 of the present invention will now be described with reference to the figures. As described above in the prior art section, a bit stream encoded based on the MPEG 2 audio encoding standard AAC contains a quantization code "x" and a scaling factor "y". A decoding device of the present example is an encoding device for calculating x^(a/b)*2 (y/c) for values of x and y contained in the audio bit stream.

The quantization code x is any integer in the range from 0 to 8191, for example, and the scaling factor y is any integer from −100 to 156. These variable ranges of x and y conform to the MPEG 2 audio encoding standard AAC (see ISO/IEC 13818-7:1997). In the following description, it is assumed that x and y take these variable ranges, though the present invention is not limited thereto.

Figure 16:
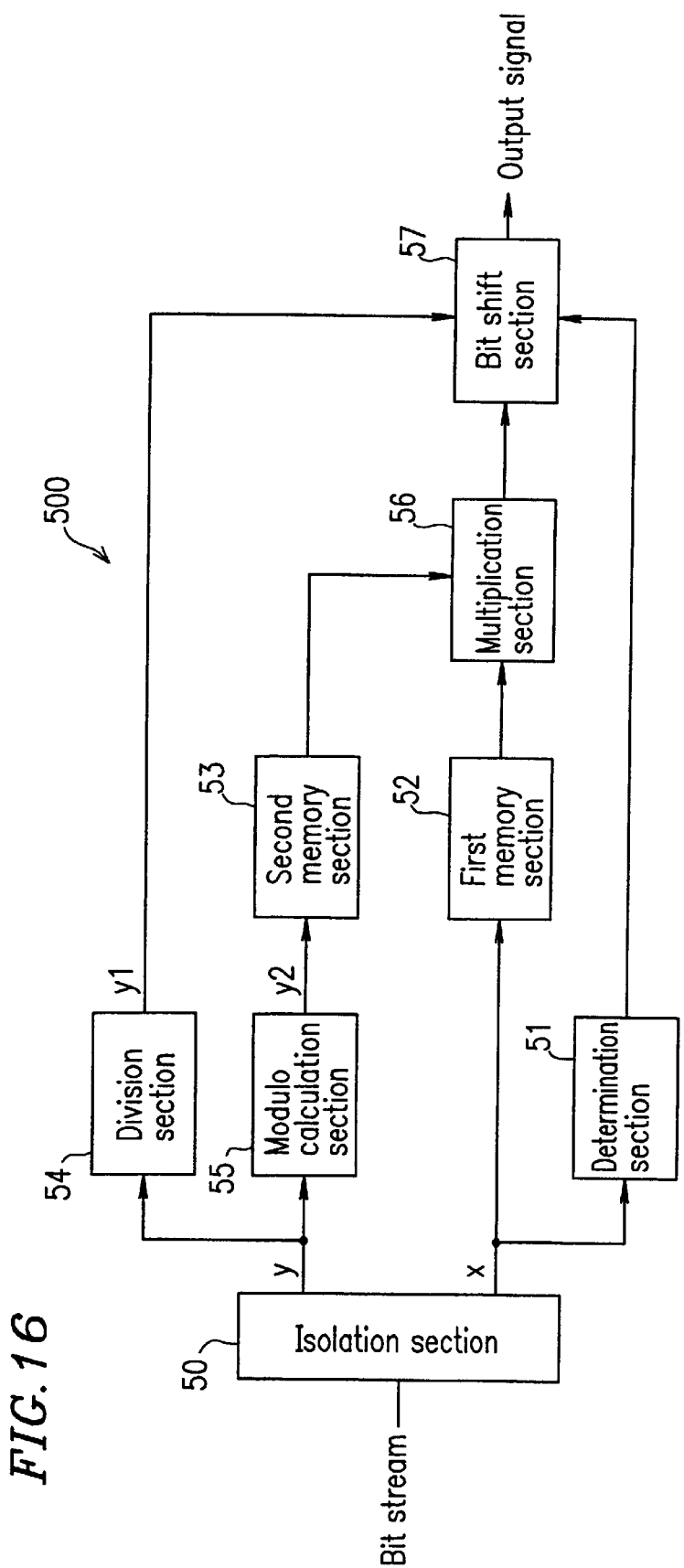
FIG. 16 is a block diagram illustrating a structure of a decoding device 500 according to Example 5 of the present invention.

FIG. 16 is a block diagram illustrating a structure of a decoding device 500 according to Example 5 of the present invention. The decoding device 500 includes an isolation section 50, a determination section 51, a first memory section 52, a second memory section 53, a division section 54, a modulo calculation section 55, a multiplication section 56 and a bit shift section 57.

Referring to FIG. 16, the isolation section 50 isolates the quantization code x and the scaling factor y from an input bit stream. The determination section 51 determines if the quantization code x output from the isolation section 50 is less than or equal to $2^N$ (where N is a predetermined integer threshold value). The determination section 51 outputs a determination result being true when x≦$2^N$ and being false when x>$2^N$. The first memory section 52 stores values according to q (a/b) in the fixed point format for integer values of q ranging from 0 to ($2^Q-1$) (wherein Q is an integer).

The first memory section 52 has the following structure. Where q is any integer within the variable range of x which is isolated from the bit stream by the isolation section 50 (0≦q<$2^Q-1$), the first memory section 52 stores values of q^(a/b) for all the possible values of q in the fixed point format. Thus, the first memory section 52 stores values of F(q) using q as an address. When the integer value q exceeds $2^N$ (N is a predetermined threshold value), F(q) represents values obtained by normalizing values of q^(a/b) with $2^{M'}$. When the integer value q is in the range from 0 to $2^N$, F(q) represents values obtained by normalizing values of q^(a/b) with $2^{M'}$ and then shifting the resulting value by (M'−M) bits. M is an integer value of (N*a)/b, and M' is an integer value of (Q*a) divided by b. The integer M is a value obtained by rounding up the value of (N*a)/b, and the integer M' is a value obtained by rounding up (Q*a)/b.

FIG. 17 illustrates the contents of the first memory section 52 of the decoding device 500. The memory section 52, as illustrated in FIG. 17, stores values of F(q) where a=4, b=3, N=5, Q=13, M=7 and M'=18. For each of the values in FIG. 17 in the fixed point format, the most significant bit is a sign bit and a decimal point is between the second bit and the third bit from the most significant bit. The second bit next to the most significant bit and D bits on the right of the decimal point are significant digits to be calculated.

The division section 54 divides the scaling factor y output from the isolation section 50 so as to obtain the quotient y1=int(y/c). The modulo calculation section 55 obtains the remainder y2=(y%c) of the division of the scaling factor y by c.

The second memory section 53 stores in the fixed point format values of G(p)=2^(p/c) for integral values of p in the range from 0 to 3 (where p is an integer within the variable range of y2) which is calculated by the modulo calculation section 55.

FIG. 18 illustrates the contents of the second memory section 53 of the decoding device 500, which contains values of G(p) where c=4. The fixed point format of the values G(p) in FIG. 18 may be the same as that in FIG. 28.

The multiplication section 56 multiplies a value of F(x) read out from the first memory section 52 by a value of G(y2) read out from the second memory section 53.

The bit shift section 57 shifts the output value from the multiplication section 56 by (y1−(M'−M)) bits, if the determination result from the determination section 51 is true, and by y1 bits, if the determination result from the determination section 51 is false, thereby outputting the shifted value.

An operation of the decoding device 500 having such a structure will be described while assuming a=4, b=3, c=4, M=7, N=5, Q=13 and D=30. The isolation section 50 of FIG. 16 isolates the quantization code x and the scaling factor y from an input bit stream. Then, the determination section 51 determines if the quantization code x is less than or equal to 2^5. The division section 54 obtains the quotient y1 of the division of the scaling factor y by 4, and the modulo calculation section 55 obtains the remainder y2 of the division of the scaling factor y by 4. The multiplication section 56 multiplies the value of F(x) from address x of the first memory section 52 by the value of G(y2) from the address y2 of the second memory section 53.

Through these operations, a value of (x^(4/3)*2^((y%4)/4)) has been output from the multiplication section 56 according to Expression (2) converted from Expression (1). Then, the bit shift section 57 shifts the output value from the multiplication section 56 by y1−(18−7) bits, if the determination result from the determination section 51 is true, and by y1 bits, if the determination result from the determination section 51 is false. The effect of such an operation is as follows. First, the operation of shifting by y1 bits corresponds to the calculation 2^int(y/4), the third term in Expression (2) (which is a multiplication of the first, second and third terms). The output value from the multiplication section 56 is multiplied by the quotient 2^y1 output from the division section 54 so as to obtain an output signal of the original magnitude.

When the determination result from the determination section 51 is true, the operation of shifting by −(18−7) bits is performed for the following reason. When x is greater than 2^5, the value of x^(4/3) has been normalized by 2^18. When x is less than or equal to 2^5, another value is stored which has been obtained by shifting up the value of x^(4/3) by (18−7) bits as compared with that when x is greater than 2^5. Thus, the value is shifted by additional 11 bits so as to adjust the final calculation result.

As described above, in the present example, even when the value of x is considerably smaller than the maximum value of the variable range thereof, the value of x^(4/3) can be retained with more significant bits up to the final stage of outputting the calculation result, whereby it is possible to calculate x(4/3)*2^(y/4) with a high accuracy. In the present example, N=5 and M=7, though any other values can be selected for N and M. For example, N may alternatively be set to 9, where M=9*4/3=12.

EXAMPLE 6

A decoding device according to Example 6 of the present invention will now be described with reference to the figures. The decoding device of this example receives a bit stream encoded based on the MPEG 2 audio decoding standard, isolates the quantization code x and the scaling factor y contained therein, and calculates Expression (3) below which is a generalized form of Expression (1).

$$x^{\wedge}(a/b)*2^{\wedge}(y/c) \qquad (3)$$

In the present example, the variable range of the quantization code x is from 0 to 4096, and the variable range of the scaling factor y is from −100 to 156, for example. In the present example, Expression (3) is converted to Expression (4) below.

$$x*x^{\wedge}((a-b)/b)*2^{\wedge}((y\%c)/c)*2^{\wedge}int(y/c) \qquad (4)$$

An operation of decoding an input bit stream by using Expression (4) and a memory section requiring even smaller memory capacity will be described.

Figure 19:
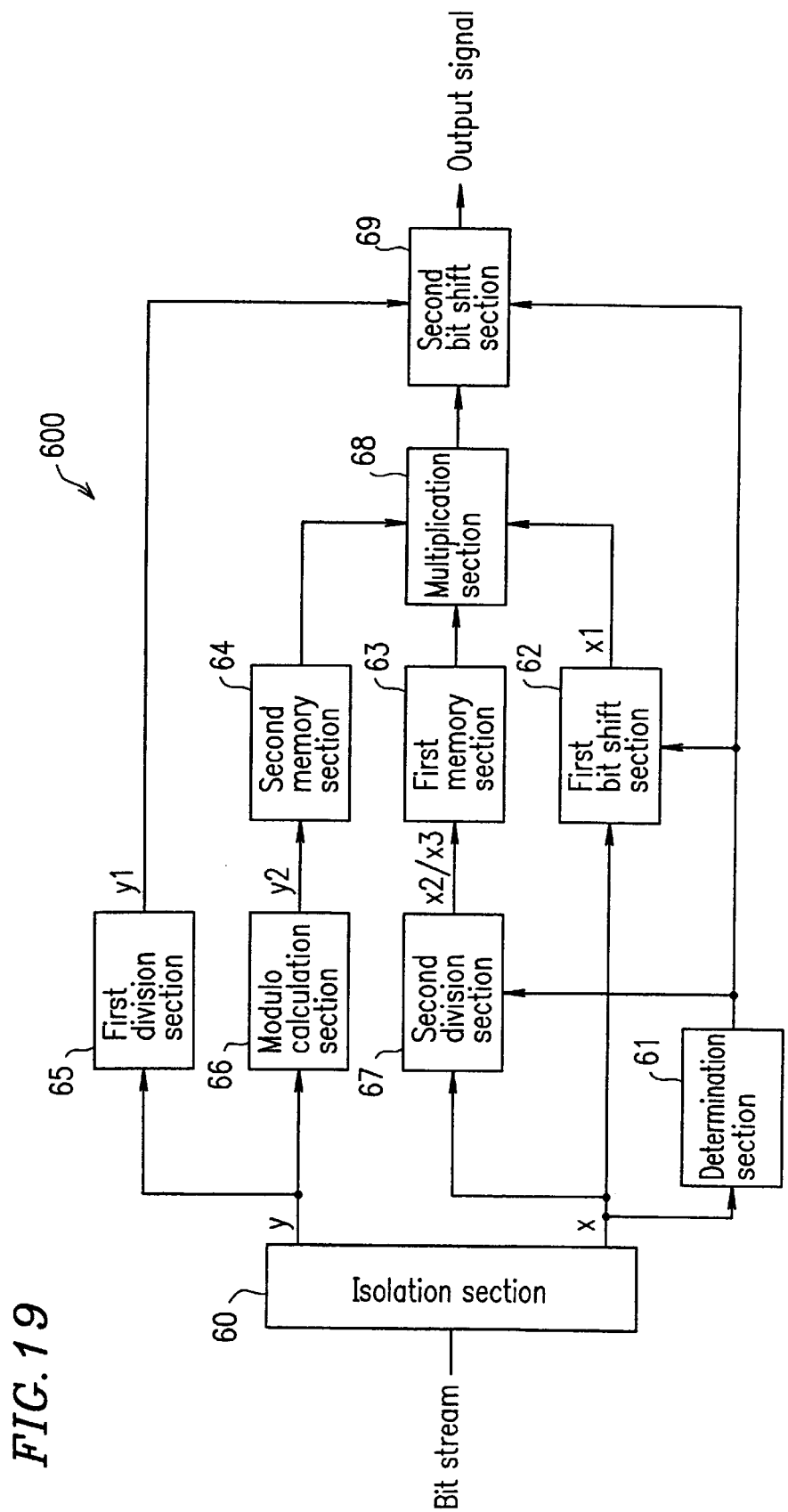
FIG. 19 is a block diagram illustrating a structure of the decoding device 600 according to Example 6 of the present invention.

FIG. 19 is a block diagram illustrating a structure of a decoding device 600 according to Example 6 of the present invention. The decoding device 600 includes an isolation section 60, a determination section 61, a first bit shift section 62, a first memory section 63, a second memory section 64, a first division section 65, a modulo calculation section 66, a second division section 67, a multiplication section 68 and a second bit shift section 69.

Referring to FIG. 19, the isolation section 60 isolates the quantization code x and the scaling factor y from the input bit stream. The determination section 61 determines if the quantization code x is less than or equal to 2^N (where N is a threshold value corresponding to the number of addresses of the first memory section 63), thereby outputting a determination result being true, if x≦2^N, and being false, if x>2^N. When x>2^N, the determination section 61 further outputs a parameter i for specifying a value of the variable x (where i is an integer which is not negative; and the variable range of x is from 2^N to 2^(N+b*i)). The value of i is determined so that x satisfies 2^(N+3(i−1))<x≦2^(N+3i). The determination result from the determination section 61 and the value of the parameter i are provided to the second division section 67, the first bit shift section 62 and the second bit shift section 69.

Assuming that the multiplication section 68, which will be described later in greater detail, functions to perform a calculation for an input value having a bit width of (D+2) in the fixed point format, where the most significant bit of the input value indicates whether the value is positive or negative, and the second most significant bit and the D bits to the right of the decimal point represent the significant digits of the input value. Then, the first bit shift section 62 converts the integer x to x1 which is a value having the fixed points format by shifting x by D−N bits, if the determination result from the determination section 61 is true, and by D−(N+b*i) bits (utilizing the value of i), if the determination result from the determination section 61 is false.

The first division section 65 performs a division of the value of y output from the isolation section 60 by c so as to output the quotient y1 thereof. The modulo calculation section 66 performs a division of the value of y output from the isolation section 60 by c so as to output the remainder y2 thereof. The second division section 67 receives the value of x which has been isolated by the isolation section 60, so as to output the value of x, without alteration, as x2, if the determination result from the determination section 61 is true, and to output an integer value of x/($2^{(b*i)}$) as x3, if the determination result from the determination section 61 is false.

The first memory section 63 stores values of H(q) for values of q (q is an integer value in the range from 0 to $2^N$). The values of H(q) are obtained by converting values of $q^{((a-b)/b)}$ into the fixed point format by shifting the values of $q^{((a-b)/b)}$ by (D−M) bits (where M is an integer value of N*(a−b) divided by b).

The second memory section 64 stores in the fixed point format values of G(p)=$2^{(p/c)}$ for values of y2 (y2=p) output from the Modulo calculation section 66. The contents of the second memory section 64 may be the same as that shown in FIG. 18, that is, values of $2^{(p/c)}$ for integer values of p in the range from 0 to 3.

The multiplication section 68 multiplies together a value from address x2 or x3 of the first memory section 63, a value from address y2 of the second memory section 64 and a value of x1 output from the first bit shift section 62. Where M is an integer value of N*(a−b) divided by b, the second bit shift section 69 shifts the output value from the multiplication section 68 by (y1+N+M) bits, if the determination result from the determination section 61 is true, and by (y1+N+M+a*i) bits, if the determination result from the determination section 61 is false.

FIG. 20 illustrates the contents of the first memory section 63 of the decoding device 600. The table illustrated in FIG. 20 contains values of H(q) in the fixed point format which are obtained by normalizing values of $q^{((a-b)/b)}$ with $2^M$ (where q is an integer value in the range from 0 to $2^N$). In this example, the values of H(q) are obtained where a=4, b=3, N=9, M=3 and D=30. M=3 is calculated from 9*(4−3)/3. As described above, in the format of this table, the most significant bit is a sign bit, and a decimal point is between the second bit and the third bit from the most significant bit. Thus, a value of H(q) is at least −2 and at most less than 2.

Figure 21:
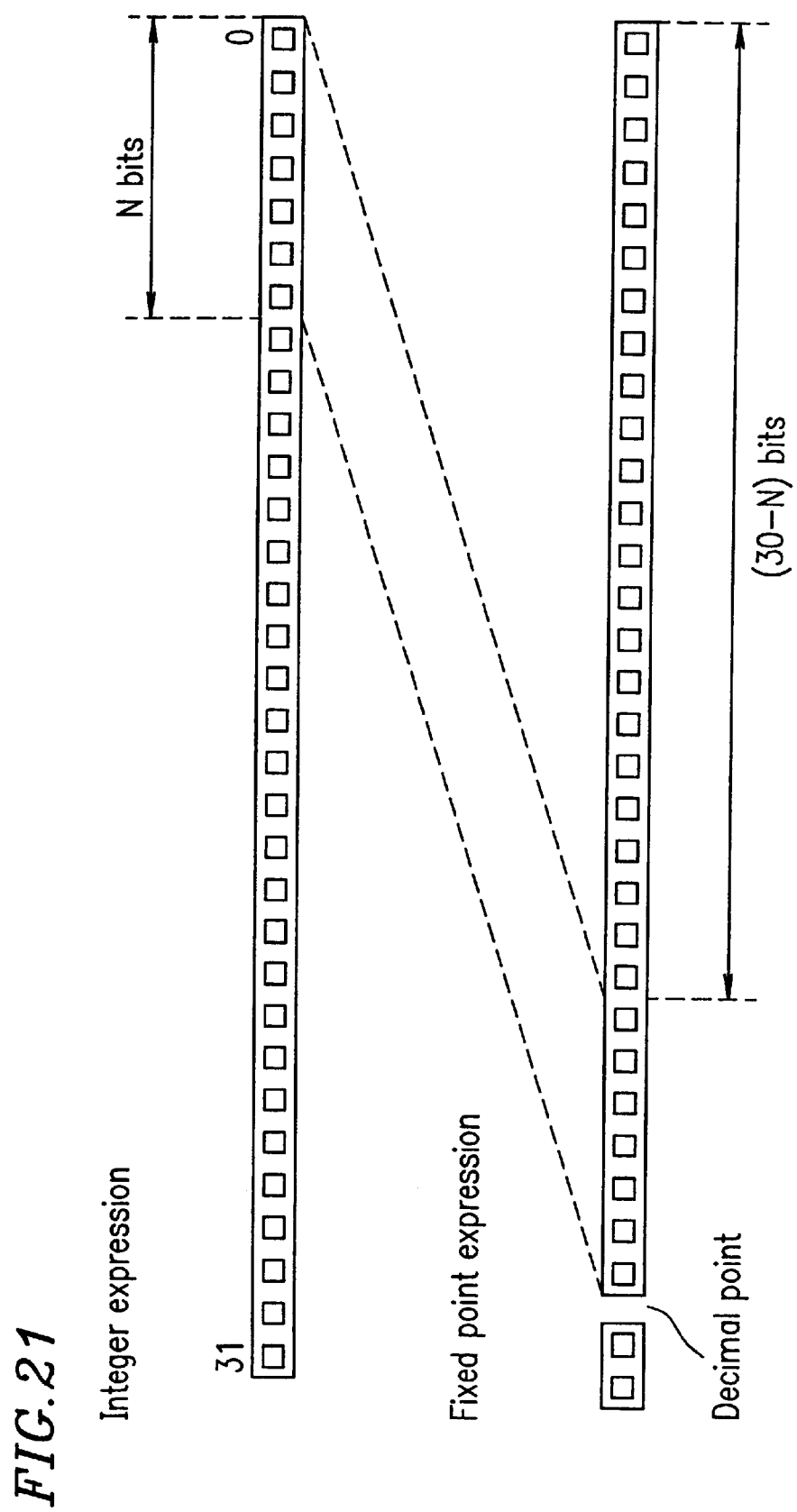
FIG. 21 illustrates a method of converting an integer value to value of a fixed point format.

FIG. 21 illustrates a method of converting an integer value to value of a fixed point format. In the present example, N=9, M=3 and D=30, though these values may be different, of course. For example, N may alternatively be set to 10, while M is set to an integer value, 4, which is obtained by rounding up 10*(4−3)/3.

An operation of the decoding device 600 having such a structure will be described while assuming a=4, b=3, c=4, M=3, N=9 and D=30, with reference to FIGS. 18 to 27. First, the isolation section 60 of FIG. 19 isolates the quantization code x and the scaling factor y from the input bit stream. Then, the determination section 61 determines if the quantization code x is less than or equal to $2^9$ (=512), and outputs a determination result being true, if x is less than or equal to $2^9$, and being false, if x exceeds $2^9$. The determination section 61 further outputs a value of i according to the variable range of the quantization code x.

Next, the first bit shift section 62 converts the integer value of x to x1 having the fixed point format by shifting x by (30−9) bits, if the determination result from the determination section 61 is true, and by 30−(9+3) bits, if the determination result from the determination section 61 is false.

Figure 28:
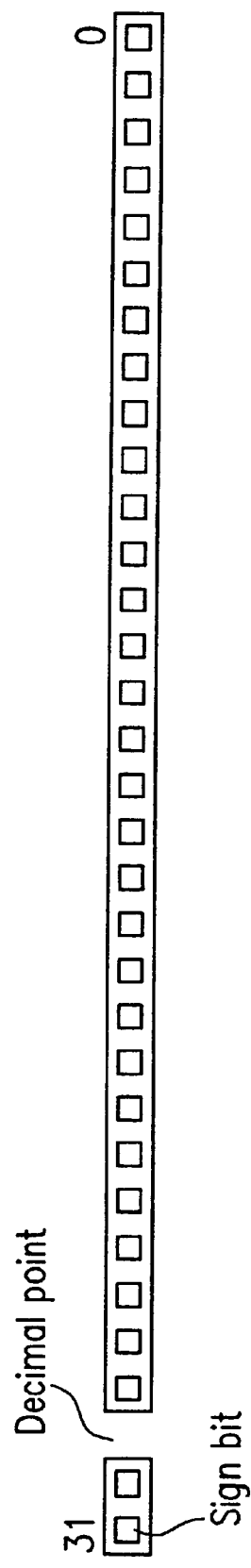
FIG. 28 illustrates an exemplary fixed point format.

This operation will further be described below in detail. As illustrated in FIG. 28, in the fixed point format of the present example, the most significant bit is a sign bit, and a decimal point is between the second bit and the third bit from the most significant bit. Thus, when x is a value which has 9 bits or less (i.e., less than or equal to $2^9$), x can be normalized by shifting x up by (30−9)=21 so that x is 1.0 or less as represented in the fixed point format, as illustrated in FIG. 21.

Similarly, when an input integer value of x has 10 to (9+3)=12 bits, x can be normalized by shifting x up by 30−(9+3)=18 so that x is 1.0 or less as represented in the fixed point format. Based on such a principle, the first bit shift section 62 converts the integer of x to x1 having the fixed point format by shifting x by (30−9)=21 bits, when the determination result from the determination section 61 is true, i.e., when x is less than or equal to 512. When the determination result from the determination section 61 is false, i.e., when x is greater than 512 and less than or equal to $2^{12}$, the first bit shift section 62 converts the integer value of x to x1 having the fixed point format by shifting x by 30−(9+3)=18 bits.

The second division section 67 outputs the value of x, without alteration, as x2, when the determination result from the determination section 61 is true, and outputs an integer value of x/8 as x3, when the determination result from the determination section 61 is false, i.e., when x is greater than $2^9$ and less than or equal to $2^{12}$. The value of x3 is used as an address of the first memory section 63 because the first memory section 63 only stores values according to $q^{(1/3)}$ for integer values of q from 0 to $2^9$, i.e., 512. Therefore, when the determination result from the determination section 61 is true, i.e., when x is less than or equal to 512, the value of x is output, without alteration, as x2, whereas when the determination result from the determination section 61 is false, i.e., when x is greater than $2^9$ and less than or equal to $2^{12}$, x3 less than or equal to 512 is generated and output by calculating an integer value of x/8.

The first division section 65 obtains a quotient y1 of a division of y by 4, and the modulo calculation section 66 obtains a remainder y2 of the division of y by 4. Then, the multiplication section 68 multiplies together a value of H(x2) from address x2 of the first memory section 63, a value of G(y2) from address y2 of the second memory section 64 and a value x1 output from the first bit shift section 62.

Through these operations, the multiplication section 68 provides a value corresponding to $x*x^{(1/3)}*2^{((y\%4)/4)}$ according to Expression (4) which is converted from Expression (3) (a value before the number of digits, i.e., gain, thereof is adjusted). This is because the output x1 from the first bit shift section 62 represents a value of x as converted into the fixed point format, the first memory section 63 stores values corresponding to $x^{(1/3)}$ in the fixed point format, and the second memory section 64 stores values according to $2^{(q/4)}$ for integer values of p in the range from 0 to 3 in the fixed point format.

Finally, the second bit shift section 69 shifts the value output from the multiplication section 68 by a number of bits according to the value of (y1+9+3), when the determination result from the determination section 61 is true, and by (y1+9+3+4*1) bits, when the determination result from the determination section 61 is false, and i=1 i.e., when x is greater than 2^9 and less than or equal to 2^12. The effect of this operation is as follows. First, the operation of shifting the output value by y1 bits is a calculation corresponding to the fourth term of Expression (4), i.e., 2^int(y/4).. The value y1 is a quotient of the division of y by 4 obtained by the first division section 65.

When the determination result from the determination section 61 is true, the operation of shifting the output value by (y1+9+3) bits is performed for the following reason. When x is less than or equal to 2^9, the value of x, which is originally an integer, is normalized with 2^9 by the first bit shift section 62 so as to be converted to a value which does not exceed 1.0. The respective values stored in the first memory section 63, which are originally less than or equal to 2^(9/3), are also converted to values which do not exceed 1.0. In other words, the output value from the multiplication section 68 is multiplied by 2^(y1+9+3), i.e., shifted up by (y1+9+3) bits, so as to convert the output value to a value as represented in the original integer format.

When x is greater than 2^9 and less than or equal to 2^12, the value of x, which is originally an integer, is normalized with 2^(9/3) by the first bit shift section 62 so as to be converted to a value which does not exceed 1.0. As described above, the respective values stored in the first memory section 63, which are originally less than or equal to 2^(9/3), are also normalized with 2^3 so as to be converted to values which do not exceed 1.0. Moreover, the second division section 67 calculates the input value of x divided by 8 so as to reference the first memory section 63 (a table for exponential calculation with an exponent of 1/3) using the calculated value as an address. Therefore, the value output from the first memory section 63 is one half of x^(1/3), because Expression (5) below holds true.

$$(x/8)^{\wedge}(1/3) = x^{\wedge}(1/3) * (1/8)^{\wedge}(1/3) \quad (5)$$

$$= x^{\wedge}(1/3) * (1/2)$$

The multiplication of the output value from the multiplication section 68 by 2^(9+3+3+1) is equivalent to shifting up the output value by (9+3+3+1)=16 bits. This bit shift operation converts the output value from the multiplication section 68 to a value in the original integer representation.

For these reasons, the second bit shift section 69 shifts the output value from the multiplication section 68 by (y1+N+M) bits, when the determination result from the determination section 61 is true, and by (y1+N+M+a*1) bits, when the determination result from the determination section 61 is false, and i=1. It should be understood that since the magnitude correlation among these values in such a numerical representation is relative, the operation to be performed by the second bit shift section 69 is for, when the determination result from the determination section 61 is false, adjusting the output of the multiplication section 68 so as to be greater than that when the determination result is true by a*i=4*1=4 bits.

As described above, in the present example, it is possible to perform a calculation using a small-capacity table as that illustrated in FIG. 21 only by a simple bit shift operation even when x has a large value. Therefore, it is possible to rapidly calculate x^(4/3)*2^(y/4) for any value of the quantization code x.

In the present example, the quantization code x is assumed to range from 0 to 4095, whereas it ranges from 0 to 8191 according to the MPEG 2 AAC standard. A method of performing a calculation in the case where the quantization code x is 4096 or greater, while assuming i=2. It should be noted herein that 4096 is 2^(9+3).

When the input value of x is equal to or greater than 2^(9+3), the first bit shift section 62 first converts x to x1 having the fixed point format by shifting x by D−(N+b*i)= 30−(9+3*2) bits. The second division section 67 obtains x2 which is an integer value of x/(2^(3*2)) for the given value of x. Then, the multiplication section 68 multiplies together a value from address x2 of the first memory section 63, a value from address y2 of the second memory section 64 and x1. Finally, the second bit shift section 69 shifts the output value from the multiplication section 68 by (y1+N+M+a*i)= (y1+9+3+4*2) bits.

The effect of the operation by the second bit shift section 69 of shifting the output value of the multiplication section 68 by (y1+N+M+8) bits when x is equal to or greater than 2^(N+3) is as follows. First, the operation of shifting by y1 bits corresponds to the calculation of 2^int(y/4), i.e., the fourth term of Expression (4). This is because y1 is an output from the division section 65, and the value thereof is a quotient of the division of y by 4.

When x is greater than 2^(N+3), x which is originally an integer is normalized with 2^(N+6) by the first bit shift section 62 so as to be converted to a value which does not exceed 1.0. As described above, the respective values stored in the first memory section 63, which are originally less than or equal to 2^(N/3), are also normalized with 2^M so as to be converted to values which do not exceed 1.0. Moreover, the second division section 67 calculates x divided by 64 so as to reference the first memory section 63 using the quotient as an address. Therefore, the value output from the first memory section 63 is one quarter of x^(1/3), because Expression (6) below holds true.

$$(x/64)^{\wedge}(1/3) = x^{\wedge}(1/3) * (1/64)^{\wedge}(1/3) \quad (6)$$

$$= x^{\wedge}(1/3) * (1/4)$$

The multiplication of the output value from the multiplication section 68 by 2^(N+M+6+2) is equivalent to shifting up the output value from multiplication section 68 by (N+M+6+2) bits. This bit shift operation converts the output value from the multiplication section 68 to a value in the original integer representation.

For these reasons, the second bit shift section 69 shifts the output value from the multiplication section 68 by (y1+N+M+8) bits, when x is greater than 2^(N+3). It should be understood that since the magnitude correlation among these values in such a numerical representation is relative, the operation to be performed by the second bit shift section 69 is for, when x is greater than 2^(N+3), adjusting the output of the multiplication section 68 so as to be greater than that when x is less than 2^N by 8 bits.

EXAMPLE 7

A decoding device according to Example 7 of the present invention will now be described with reference to the figures. The decoding device of this example also receives a bit stream encoded based on the MPEG 2 audio decoding standard, isolates the quantization code x and the scaling factor y contained therein, and calculates Expression (3) below which is a generalized form of Expression (1).

$$x\ensuremath{^\vee}(a/b)*2\ensuremath{^\vee}(y/c) \quad (3)$$

In the present example, the variable range of the quantization code x is from 0 to 8191, and the variable range of the scaling factor y is from −100 to 156, for example. In the present example, Expression (3) is converted to Expression (4) below.

$$x*x\hat{}((a-b)/b)*2\hat{}((y\%c)/c)*2\hat{}int(y/c) \quad (4)$$

An operation of decoding an input bit stream by using Expression (4) and a memory section requiring even smaller memory capacity will be described.

Figure 22:
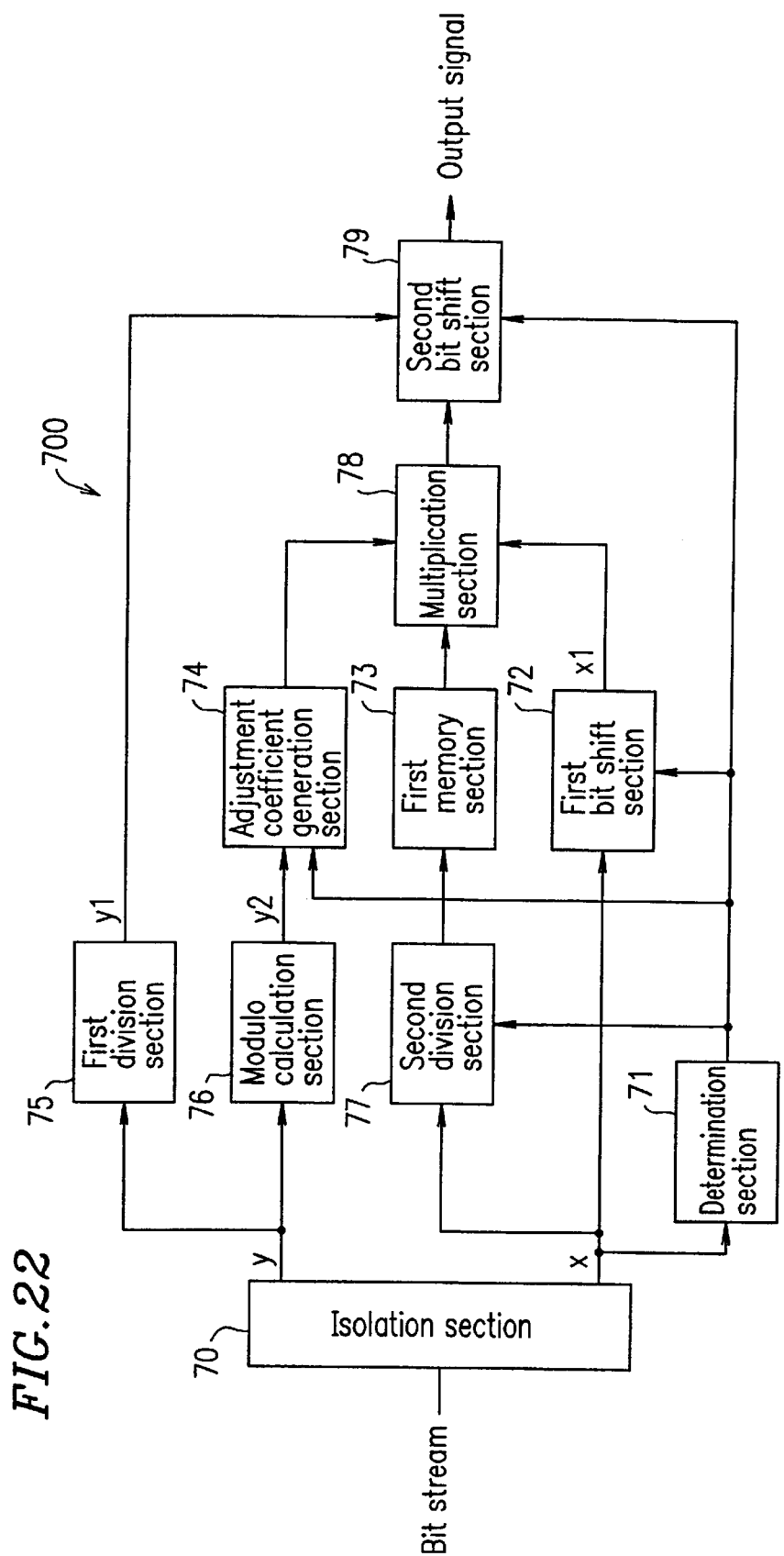
FIG. 22 is a block diagram illustrating a structure of the decoding device 700 according to Example 7 of the present invention.

FIG. 22 is a block diagram illustrating a structure of a decoding device 700 according to Example 6 of the present invention. The decoding device 700 includes an isolation section 70, a determination section 71, a first bit shift section 72, a first memory section 73, an adjustment coefficient generation section 74, a first division section 75, a modulo calculation section 76, a second division section 77, a multiplication section 78 and a second bit shift section 79.

Referring to FIG. 22, the isolation section 70 isolates the quantization code x and the scaling factor y from the input bit stream. The determination section 71 determines if the quantization code x is less than or equal to 2^N (where N is a threshold value corresponding to the number of addresses of the first memory section 73), thereby outputting a determination result being true, if x≦2^N, and being false, if x>2^N. When x>2^N, the determination section 71 further outputs a parameter j for specifying a value of the variable x. (where j is an integer which is not negative; and the variable range of x is from 2^N to 2^(N+J)). The value of j is determined so that x satisfies 2^(N+(j−1)<x≦2^(N+j) when x is greater than 2^N, while j is set to 0 when x is less than or equal to 2^N. The determination result from the determination section 71 and the value of the parameter j are provided to the second division section 77, the first bit shift section 72, the second bit shift section 79 and the adjustment coefficient generation section 74.

Assuming that the multiplication section 78, which will be described later in greater detail, functions to perform a calculation for an input value having a bit width of (D+2) in the fixed point format, where the most significant bit of the input value indicates whether the value is positive or negative, and the second most significant bit and the D bits to the right of the decimal point represent the significant digits of the input value. Then, the first bit shift section 72 converts the integer x to x1 which is a value having the fixed point format by shifting x by D−N bits, if the determination result from the determination section 71 is true, and by D−(N+j) bits (utilizing the value of j), if the determination result from the determination section 71 is false.

The first division section 75 performs a division of the value of y output from the isolation section 70 by c so as to output the quotient y1 thereof. The modulo calculation section 76 performs a division of the value of y output from the isolation section 70 by c so as to output the remainder y2 thereof. The second division section 77 receives the value of x which has been isolated by the isolation section 70, so as to output the value of x, without alteration, as x2, if the determination result from the determination section 71 is true, and to output an integer value of x/(2^j) as x3, if the determination result from the determination section 71 is false.

The first memory section 73 stores values of H(q) for values of q (q is an integer value in the range from 0 to 2^N). The values of H(q) are obtained by converting values of q^((a−b)/b) into the fixed point format by shifting the values of q^(a−b)/b) by (D−M) bits (where M is an integer value of N*(a−b) divided by b).

The adjustment coefficient generation section 74 generates in the fixed point format values of 2^(p/c)*2^(j/b) as I(p,j) for the value of y2 (y2=p) output from the modulo calculation section 76 and the value of j.

The adjustment coefficient generation section 74 has a memory section where values of I(p,j) have been stored in advance.

FIG. 23 illustrates the contents of the adjustment coefficient generation section 74 of the decoding device 700. The adjustment coefficient generation section 74 illustrated in FIG. 23 contains values of I(p,j) where b=3 and c=4. The following should be noted herein. The maximum value of 2^(p/4)*2^(j/3) is j=13−N in the present example, which is, when N=9, 2^(3/4)*2^(4/3), thus exceeding 2.0. Since the present example also employs the fixed point format, as illustrated in FIG. 28, the table for I(p,j) stores values obtained by shifting down values of 2^(p/4)*2^(j/3) by 2 bits. Of course, the adjustment for the bit shift operation by 2 bits should be accounted for in an output signal. This will be described later.

The multiplication section 78 multiplies together a value from address x2 or x3 of the first memory section 73, a value from address y2, j of the adjustment coefficient generation section 74 and a value of x1 output from the first bit shift section 72. Where M is an integer value of N*(a−b) divided by b, the second bit shift section 79 shifts the output value from the multiplication section 78 by (y1+N+M) bits, if the determination result from the determination section 71 is true, and by (y1+N+M+j) bits, if the determination result from the determination section 71 is false. During this operation, the above-described adjustment for the 2 bits due to the structure illustrated in FIG. 23 is performed, i.e., the already shifted value is further shifted up by 2 bits.

As in the first memory section 63 of the decoding device 600 according to Example 6 of the present invention, the first memory section 73 has a table containing values, as illustrated in FIG. 20. The table illustrated in FIG. 20 contains values of H(q) in the fixed point format which are obtained by normalizing values of q^((a−b)/b) with 2^M (where q is an integer value in the range from 0 to 2^N). In this example, the values of H(q) are obtained where a=4, b=3, N=9, M=3 and D=30. M=3 is calculated from 9*(4−3)/3. As described above, in the format of this table, the most significant bit is a sign bit, and a decimal point is between the second bit and the third bit from the most significant bit. Thus, a value of H(q) is at least −2 and at most less than 2.

As described above, FIG. 21 illustrates a method of converting an integer value to value of a fixed point format. In the present example, N=9, M=3 and D=30, though these values may be different, of course. For example, N may alternatively be set to 10, while M is set to an integer value, 4, which is obtained by rounding up 10*(4−3)/3.

An operation of the decoding device 700 having such a structure will be described while assuming a=4, b=3, c=4, M=3, N=9 and D=30, with reference to FIGS. 20 to 23. First, the isolation section 70 of FIG. 22 isolates the quantization code x and the scaling factor y from the input bit stream. Then, the determination section 71 determines if the quantization code x is less than or equal to 2^9 (=512), and outputs a determination result being true, if x is less than or equal to 2^9, and being false, if x exceeds 2^9. The determination section 71 further outputs a value of j according to the variable range of the quantization code x.

Next, the first bit shift section 72 converts the integer value of x to x1 having the fixed point format by shifting x by (30−9) bits, if the determination result from the determination section 71 is true, and by 30−(9+j) bits, if the determination result from the determination section 71 is false.

This operation will further be described below in detail. As illustrated in FIG. 28, in the fixed point format of the present example, the most significant bit is a sign bit, and a decimal point is between the second bit and the third bit from the most significant bit. Thus, when x is a value which has 9 bits or less (i.e., less than or equal to 2^9), x can be normalized by shifting x up by (30−9)=21 so that x is 1.0 or less as represented in the fixed point format, as illustrated in FIG. 21.

Similarly, when an input integer value of x has 10 bits or more (e.g., 11 bits), x can be normalized by shifting x up by 30−11=19 so that x is 1.0 or less as represented in the fixed point format. Based on such a principle, the first bit shift section 72 converts the integer of x to x1 having the fixed point format by shifting x by (30−9)=21 bits, when the determination result from the determination section 71 is true, i.e., when x is less than or equal to 512. When the determination result from the determination section 71 is false, the first bit shift section 72 converts the integer value of x to x1 having the fixed point format by shifting x by a number of bits according to the number of bits of x.

The second division section 77 outputs the value of x, without alteration, as x2, when the determination result from the determination section 71 is true, and outputs an integer value of x/(2^j) as x3, when the determination result from the determination section 71 is false, i.e., when x is greater than 2^9. The value of x3 is used as an address of the first memory section 73 because the first memory section 73 only stores values according to q^(1/3) for integer values of q from 0 to 2^9, i.e., 512. Therefore, when the determination result from the determination section 71 is true, i.e., when x is less than or equal to 512, the value of x is output, without alteration, as x2, whereas when the determination result from the determination section 71 is false, x3 less than or equal to 512 is generated and output by calculating an integer value of x/(2^j).

The first division section 75 obtains a quotient y1 of a division of y by 4, and the modulo calculation section 76 obtains a remainder y2 of the division of y by 4. Then, the multiplication section 78 multiplies together a value of H(x2) from address x2 of the first memory section 73, a value of I(y2,J) from address y2,j of the adjustment coefficient generation section 74 and a value x1 output from the first bit shift section 72.

Through these operations, the multiplication section 78 provides a value corresponding to x*x^(1/3)*2^((y%4)/4) according to Expression (4) which is converted from Expression (3) (a value before the number of digits, i.e., gain, thereof is adjusted). This is because the output x1 from the first bit shift section 72 represents a value of x as converted into the fixed point format, the first memory section 73 stores values corresponding to x^(1/3) in the fixed point format, and the adjustment coefficient generation section 74 stores values of 2^(p/4)*2^(j/3) for integer values p from 0 to 3 and values of j in the fixed point format. The value 2^(p/4) is multiplied by 2^(j/3) for the following reason. When x is greater than 2^N, the second division section 77 calculates the input value of x divided by 2^j, so as to reference the first memory section 73 (a table for exponential calculation with an exponent of 1/3) using the calculated value as an address. Therefore, the value output from the first memory section 73 is an value of x^(1/3) divided by 2^(j/3), because Expression (6) below holds true.

$$(x/(2^j))^{\wedge}(1/3) = x^{\wedge}(1/3) * (1/(2^{\wedge} j))^{\wedge}(1/3) \quad (6)$$

-continued
$$= x^{\wedge}(1/3)/2^{\wedge}(j/3)$$

Thus, in order to calculate x^(1/3), the output value from the first memory section 73 has to be multiplied by 2^(j/3), and therefore values thereof are provided in the adjustment coefficient generation section 74 in advance.

Finally, the second bit shift section 79 shifts the value output from the multiplication section 78 by a number of bits according to the value of (y1+9+3), when the determination result from the determination section 71 is true, and by (y1+9+3+2) bits, when the determination result from the determination section 71 is false, and j=2, for example, i.e., when x is greater than 2^10 and less than or equal to 2^11. The effect of this operation is as follows. First, the operation of shifting the output value by y1 bits is a calculation corresponding to the fourth term of Expression (4), i.e., 2^int(y/4). The value y1 is a quotient of the division of y by 4 obtained by the first division section 75.

When the determination result from the determination section 71 is true, the operation of shifting the output value by (y1+9+3) bits is performed for the following reason. When x is less than or equal to 2^9, the value of x, which is originally an integer, is normalized with 2^9 by the first bit shift section 72 so as to be converted to a value which does not exceed 1.0. The respective values stored in the first memory section 73, which are originally less than or equal to 2^(9/3), are also normalized with 2^3 so as to be converted to values which do not exceed 1.0. In other words, the output value from the multiplication section 78 is multiplied by 2 (y1+9+3), i.e., shifted up by (y1+9+3) bits, so as to convert the output value to a value as represented in the original integer format.

When x is greater than 2^9, e.g., in the range from 2^10 to 2^11, the value of x, which is originally an integer, is normalized with 2^(9+2) by the first bit shift section 72 so as to be converted to a value which does not exceed 1.0. The respective values stored in the first memory section 73, which are originally less than or equal to 2^(9/3), are also normalized with 2^3 so as to be converted to values which do not exceed 1.0.

The multiplication of the output value from the multiplication section 78 by 2^(9+3+2) is equivalent to shifting up the output value from the multiplication section 78 by (9+3+2)=14 bits. This bit shift operation converts the output value from the multiplication section 78 to a value in the original integer representation.

For these reasons, the second bit shift section 79 shifts the output value from the multiplication section 78 by (y1+N+M) bits, when the determination result from the determination section 71 is true, and by (y1+N+M+j) bits, when the determination result from the determination section 71 is false. It should be noted herein that in the present example, the adjustment for the 2 bits due to the structure illustrated in FIG. 23 is performed, as described above, i.e., the already shifted value is further shifted up by 2 bits.

It should be understood that since the magnitude correlation among these values in such a numerical representation is relative, the operation to be performed by the second bit shift section 79 is for, when the determination result from the determination section 71 is false, adjusting the output of the multiplication section 78 so as to be greater than that when the determination result is true by j bits.

As described above, in the present example, it is possible to perform a calculation using a small-capacity table as that illustrated in FIG. 20 only by a simple bit shift operation even when x has a large value. Therefore, it is possible to rapidly calculate x^(4/3)*2^(y/4) for any value of the quantization code x. In Example 7, as compared to Example 6, the adjustment coefficient generation section 74 is required to have a larger table, but calculation can be performed with an even higher accuracy.

EXAMPLE 8

A decoding device according to Example 8 of the present invention will now be described with reference to the figures. The decoding device of this example also receives a bit stream encoded based on the MPEG 2 audio decoding standard, isolates the quantization code x and the scaling factor y contained therein, and calculates Expression (3) below which is a generalized form of Expression (1).

$$x^{\wedge}(a/b)*2^{\wedge}(y/c) \qquad (3)$$

In the present example, the variable range of the quantization code x is from 0 to 8191, and the variable range of the scaling factor y is from −100 to 156, for example. In the present example, Expression (3) is converted to Expression (4) below.

$$x*x^{\wedge}((a-b)/b)*2^{\wedge}((y\%c)/c)*2^{\wedge}int(y/c) \qquad (4)$$

An operation of decoding an input bit stream by using Expression (4) and a memory section requiring even smaller memory capacity will be described.

Figure 24:
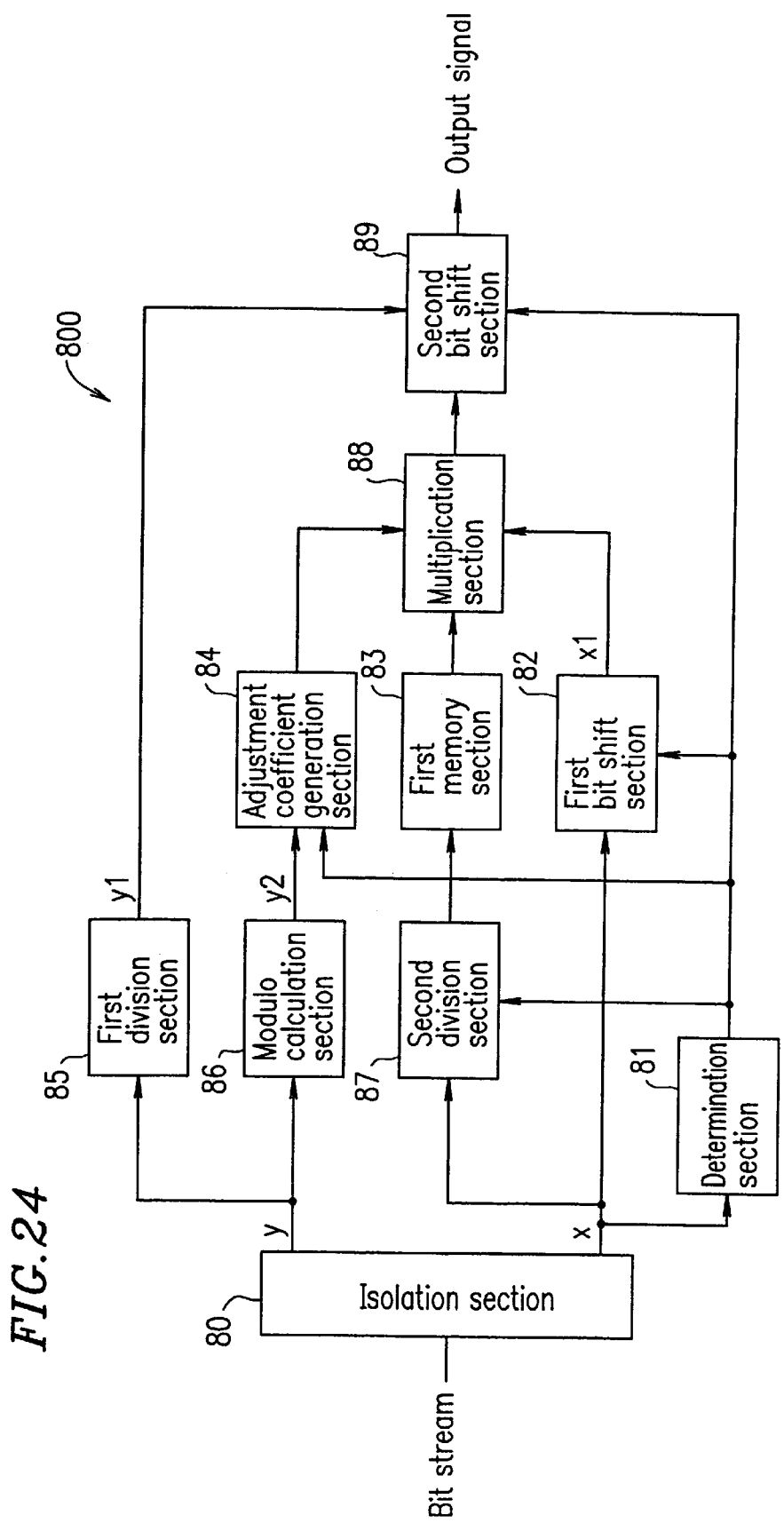
FIG. 24 is a block diagram illustrating a structure of the decoding device 800 according to Example 8 of the present invention.

FIG. 24 is a block diagram illustrating a structure of a decoding device 800 according to Example 8 of the present invention. The decoding device 800 includes an isolation section 80, a determination section 81, a first bit shift section 82, a first memory section 83, an adjustment coefficient generation section 84, a first division section 85, a modulo calculation section 86, a second division section 87, a multiplication section 88 and a second bit shift section 89.

Referring to FIG. 24, the isolation section 80 isolates the quantization code x and the scaling factor y from the input bit stream. The determination section 81 determines the number k of digits of the quantization code x represented in the binary form, and outputs the value of k. The determination section 81 provides the value of k to the second division section 87, the first bit shift section 82, the second bit shift section 89 and the adjustment coefficient generation section 84.

Assuming that the multiplication section 88, which will be described later in greater detail, functions to perform a calculation for an input value having a bit width of (D+2) in the fixed point format, where the most significant bit of the input value indicates whether the value is positive or negative, and the second most significant bit and the D bits to the right of the decimal point represent the significant digits of the input value. Then, the first bit shift section 82 converts the integer x to x1 which is a value having the fixed point format by shifting x by D−k bits.

The first division section 85 performs a division of the value of y output from the isolation section 80 by 4 so as to output the quotient y1 thereof. The modulo calculation section 86 performs a division of the value of y output from the isolation section 80 by 4 so as to output the remainder y2 thereof. The second division section 87 obtains an integer value of x/(2^(k−N)) (where N is a predetermined threshold value) for a value of x output from the isolation section 80 so as to output the obtained value as x'. In particular, the second division section 87 calculates x' by shifting x up by (N−k) bits, when N−k is positive, and by shifting x down by (k−N) bits, when N−k is negative.

The first memory section 83 stores values of H(q) for values of q (q is an integer value equal to or greater than 2^(N−1) and less than 2^N) using the lower (N−1) bits of q as an address. The values of H(q) are obtained by converting values of q^((a−b)/b) into the fixed point format by shifting the values of q^((a−b)/b) by (D−M) bits (where M is an integer value of N*(a−b) divided by b).

The adjustment coefficient generation section 84 generates in the fixed point format values of 2^(p/c)*2^((k−N)/b) as I(p,k) for the value of y2 (y2=p) output from the modulo calculation section 86 and the value of k. The adjustment coefficient generation section 84 has a memory section where values of I(p,k) have been stored in advance.

FIG. 25 illustrates the contents of the adjustment coefficient generation section 84 of the decoding device 800. The adjustment coefficient generation section 84 of FIG. 25 stores values of I(p,k) where b=3 and c=4. The following should be noted herein. The maximum value of 2^(p/4)*2^((k−N)/3) is 2^(3/4)*2^(4/3) in the present example, where k=13 and N=9, thus exceeding 2.0. Since the present example also employs the fixed point format, as illustrated in FIG. 28, the table for I(p,k) stores values obtained by shifting down values of 2^(p/4)*2^((k−N)/3) by 2 bits. Of course, the adjustment for the bit shift operation by 2 bits should be accounted for in an output signal. This will be described later.

The multiplication section 88 multiplies together a value from address x' of the first memory section 83, a value from address y2, k of the adjustment coefficient generation section 84 and a value of x1 output from the first bit shift section 82. Where M is an integer value of N*(a−b) divided by b, the second bit shift section 89 shifts the output value from the multiplication section 88 by (y1+M+k) bits based on the determination result from the determination section 81. During this operation, the above-described adjustment for the 2 bits due to the structure illustrated in FIG. 25 is performed, i.e., the already shifted value is further shifted up by 2 bits.

FIG. 26 illustrates the contents of the first memory section 83 of the decoding device 800. The table illustrated in FIG. 26 contains values of H(q) for values of q^(q is an integer value equal to or greater than 2^(N−1) and less than 2^N) using the lower (N−1) bits of q as an address. The values of H(q) are obtained by converting values of q^((a−b)/b) into the fixed point format by shifting the values of q^((a−b)/b) by (D−M) bits (where M is an integer value of N*(a−b) divided by b). In this example, the values of H(q) are obtained where a=4, b=3, N=9, M=3 and D=30M=3 is calculated from 9*(4−3)/3. As described above, in the format of this table, the most significant bit is a sign bit, and a decimal point is between the second bit and the third bit from the most significant bit. Thus, a value of H(q) is at least −2 and at most less than 2.

It should be noted herein, in FIG. 26, a value of H(q) for q=256 (=2^(N−1)) is stored at address 0, and a value of H(q) for q=511 (=2^N−1) is stored at address 255. The table contains such values for the following reason. Where k denotes the number of bits of x represented in the binary form, the second division section 87 calculates x' by shifting x up by (N−k) bits, when N−k is positive, and by shifting x down by (k−N) bits, when N−k is negative, whereby the $N^{th}$ bit of x' is always 1. Therefore, the table of FIG. 26 can be referenced using only the lower (N−1) bits of x' as an address. As a result, the size of the table can be reduced to half.

As described above, FIG. 21 illustrates a method of converting an integer value to value of a fixed point format. In the present example, N=9, M=3 and D=30, though these values may be different, of course. For example, N may alternatively be set to 10, while M is set to an integer value, 4, which is obtained by rounding up 10*(4−3)/3.

An operation of the decoding device 800 having such a structure will be described while assuming a=4, b=3, c=4, M=3, N=9 and D=30, with reference to FIGS. 21 and 24 to 26. First, the isolation section 80 of FIG. 24 isolates the quantization code x and the scaling factor y from the input bit stream. Then, the determination section 81 determines the number k of digits of the quantization code x represented in the binary form, and outputs the value of k.

Next, the first bit shift section 82 converts the integer value of x to x1 having the fixed point format by shifting x by (30−k) bits.

This operation will further be described below in detail. As illustrated in FIG. 28, in the fixed point format of the present example, the most significant bit is a sign bit, and a decimal point is between the second bit and the third bit from the most significant bit. Thus, x can be normalized by shifting x up by (30−k) so that x is 1.0 or less as represented in the fixed point format, as illustrated in FIG. 21.

The second division section 87 obtains a value of x' by shifting x up by (N−k) bits, when N−k is positive, and shifting x down by (k−N) bits, when N−k is negative, so as to output the obtained value of x'. The lower (N−1) bits of x' are used as an address of the first memory section 83 because the $N^{th}$ bit of x' is always 1, as described above.

The first division section 85 obtains a quotient y1 of a division of y by 4, and the modulo calculation section 86 obtains a remainder y2 of the division of y by 4. Then, the multiplication section 88 multiplies together a value of H(x2) from address x2 (where x2 is a value represented by the lower (N−1) bits of x') of the first memory section 83, a value of I(y2,k) from address x2,k of the adjustment coefficient generation section 84 and a value x1 output from the first bit shift section 82.

Through these operations, the multiplication section 88 provides a value corresponding to $x*x^{\wedge}(1/3)*2^{\wedge}((y\%4)/4)$ according to Expression (4) which is converted from Expression (3) (a value before the number of digits, i.e., gain, thereof is adjusted). This is because the output x1 from the first bit shift section 82 represents a value of x as converted into the fixed point format, the first memory section 83 stores values corresponding to $x^{\wedge}(1/3)$ in the fixed point format, and the adjustment coefficient generation section 84 stores values of $2^{\wedge}(p/4)*2^{\wedge}((k-N)/3)$ for integer values p from 0 to 3 and values of k in the fixed point format. The value $2^{\wedge}(q/4)$ is multiplied by $2^{\wedge}((k-N)/3)$ for the following reason. The input value of x has been converted to $x'=x/(2^{\wedge}(k-N))$ using the number k of digits of x by the second division section 87, and values obtained by raising x' to the power of 1/3 are stored in the first memory section 83. Therefore, the value output from the first memory section 83 is a value of $x^{\wedge}(1/3)$ divided by $2^{\wedge}((k-N)/3)$, because Expression (7) below holds true.

$$(x/(2^{\wedge}(k-N)))^{\wedge}(1/3) = x^{\wedge}(1/3)*(1/(2^{\wedge}(k-N)))^{\wedge}(1/3) \quad (7)$$

$$= x^{\wedge}(1/3)/2^{\wedge}((k-N)/3)$$

Thus, in order to calculate $x^{\wedge}(1/3)$, the output value from the first memory section 83 has to be multiplied by $2^{\wedge}((k-N)/3)$, and therefore values thereof are provided in the adjustment coefficient generation section 84 in advance.

Finally, the second bit shift section 89 shifts the value output from the multiplication section 88 by a number of bits according to the value of (y1+M+k) based on the value of k obtained by the determination section 81. The effect of this operation is as follows. First, the operation of shifting the output value by y1 bits is a calculation corresponding to the fourth term of Expression (4), i.e., $2^{\wedge}int(y/4)$. The value y1 is a quotient of the division of y by 4 obtained by the first division section 85.

Moreover, the operation of shifting the output value by (y1+M+k) bits is performed for the following reason. The value of x, which is originally an integer, is normalized with $2^{\wedge}k$ by the first bit shift section 82 so as to be converted to a value which does not exceed 1.0. The respective values stored in the first memory section 83, which are originally less than or equal to $2^{\wedge}M$ (M=9/3 in this example), are also normalized with $2^{\wedge}M$ so as to be converted to values which do not exceed 1.0. In other words, the output value from the multiplication section 88 is multiplied by $2^{\wedge}(y1+M+k)$, i.e., shifted up by (y1+M+k) bits, so as to convert the output value to a value as represented in the original integer format.

It should, be noted herein that in the present example the adjustment for the 2 bits due to the structure illustrated in FIG. 25 is performed, as described above, i.e., the already shifted value is further shifted up by 2 bits.

It should be understood that since the magnitude correlation among these values in such a numerical representation is relative, and M is a predetermined constant, the operation to be performed by the second bit shift section 89 is to adjust the output of the multiplication section 88 according to the value of k obtained by the determination section 81 and y1.

As described above, in the present example, it is possible to perform a calculation using a small-capacity table as that illustrated in FIG. 26 only by a simple bit shift operation even when x has a large value. Therefore, it is possible to rapidly calculate $x^{\wedge}(4/3)*2^{\wedge}(y/4)$ for any value of the quantization code x. In Example 8, as compared to Example 7, the adjustment coefficient generation section 84 is required to have a larger table, but the size of the table to be provided to the first memory section can be reduced.

The present invention provides an exponential calculation device for calculating $x^{\wedge}(a/b)$ for an input value of x, where a small-capacity table is provided for input values of x within a predetermined range, in order to approximately calculate $x^{\wedge}(a/b)$. Thus, in order to calculate $x^{\wedge}(a/b)$, a table with a large capacity is not required for storing values of $x^{\wedge}(a/b)$ for all the possible values of x contemplated. Thus, it is possible to approximately calculate $x^{\wedge}(a/b)$ with small-scale hardware. Particularly, the accuracy in the approximate calculation can be well maintained by providing a table for input values of x' less than or equal to the threshold value A while providing a parameter j for specifying a value of the variable x such that $x'=x/2^{\wedge}j$, or by providing a table for values of x' equal to or greater than $2^{\wedge}(B-1)$ and less than $2^{\wedge}B-1$.

According to the present invention, when the input value of x exceeds the threshold value A, x can be divided and converted by an easy method by shifting x down by a number of bits. This is effective particularly when x is likely to be less than or equal to the threshold value A.

According to the present invention, the core section holds in a table values of $x'^{\wedge}(a/b)$ or $x'^{\wedge}(L/b)$ for all the possible values of x', whereby it is possible to convert x' to z' by referencing a small-capacity table, thus reducing the cost of an exponential calculation. Particularly, when the core section has in a table values of $x'^{\wedge}(L/b)$, values of z' to be contained in the table are smaller (and thus a smaller number of digits), thereby further reducing the capacity of the ROM table.

According to the present invention, when the threshold value A is determined based on the occurrence rate of x so that x is less than or equal to A with a frequency of a predetermined value or greater, the load on the core section can be reduced without substantially lowering the quality of the decoding process for a signal.

According to the present invention, the output control section has a memory section storing values of $2^{\wedge}(j*a/b)$ or $2^{\wedge}((k-B)*a/b)$, and the input value of the output control section is multiplied by a value read out from the memory section using j or k as an address so as to output the multiplied value. Thus, practice of the present invention does not substantially add to the amount of calculation required.

According to the present invention, where B is an integer and $A=2^{\wedge}B$, the determination section determines the value of j so that x satisfies $2^{\wedge}(B+(j-1)) \leq x < 2^{\wedge}(B+J)$, when x is greater than A. Therefore, the value of j is the number of bits of x represented in the binary form minus the value of B, thus realizing the operation by the input control section by means of a simple bit shift operation.

According to the present invention, the core section has a memory section storing values of $q^{\wedge}(a/b)$ for integer values of q (where q is equal to or greater than $2^{\wedge}(B-1)$ and less than $2^{\wedge}B$) using at least the lower (B−1) bits of q as an address. The value of z' is multiplied by a value read out from the memory section using at least the lower (B−1) bits of x' as an address, and the multiplied value is output, thereby realizing addressing by a very simple bit operation.

In the decoding device of the present invention, even when the value of the quantization code x is considerably smaller than the maximum value of the variable range thereof, the value of $x^{\wedge}(a/b)$ can be retained with more significant bits up to the final stage of outputting the calculation result, whereby it is possible to calculate $x(a/b)*2^{\wedge}(y/c)$ with a high accuracy.

In the decoding device of the present invention, even when the quantization code x has a small value, it is possible to accurately calculate $x(a/b)*2^{\wedge}(y/c)$ by a processing procedure of the fixed point format (DSP). Moreover, even when the value of the quantization code x is greater than the value stored in the first memory section of a small scale, calculation can be performed using the small-scale first memory section. Therefore, it is possible to rapidly calculate $x^{\wedge}(a/b)*2(y/c)$ for any value of the quantization code x.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A decoding device for extracting a variable quantization code x and a variable scaling factor y from an input bit stream containing the quantization code x and the scaling factor y and calculating $x^{\wedge}(a/b)*2^{\wedge}(y/c)$ (where a, b and c are each an integer constant), the device comprising:

an isolation section for isolating x and y from the input bit stream;

a first bit shift section for, when $x \leq 2^{\wedge}N$ (where N is a predetermined threshold value), shifting x by a number of bits according to N so as to convert x to x1 which is in a fixed point format;

a first memory section for storing, for all possible values of q (where q is an integer such that $0 \leq q \leq 2^{\wedge}N$), using q as an address, values of H(q) which have been converted to a fixed point format by shifting $q^{\wedge}((a-b)/b)$ by a number of bits according to M (where M is an integer value of $(N*(a-b))/b$);

a second memory section for storing, for all possible values of p (where $0 \leq p < c$), values of $G(p)=2^{\wedge}(p/c)$ in a fixed point format;

a division section for calculating y1, where y1=int(y/c);

a modulo calculation section for calculating y2=y%c;

a multiplication section for outputting a value obtained by multiplying together a value of H(x) which has been read out from the first memory section using x as an address, a value of G(y2) which has been read out from the second memory section using y2 as an address and a value of x1 which has been converted by the first bit shift section; and a second bit shift section for shifting the output value from the multiplication section by a number of bits according to y1 obtained by the division section.

2. A decoding device according to claim 1, wherein:

the number of bits according to N is (D−N) (where D is a number of significant digits of a fractional portion of a number involved in a fixed point calculation operation); and the number of bits according to y1 is (y1+(N+M)).

3. A decoding device according to claim 1, wherein:

M is an integer obtained by rounding up $(N*(a-b))/b$.

4. A decoding device according to claim 1, wherein a=4, b=3 and c=4.

5. A decoding device according to claim 1, further comprising:

a determination section for outputting a determination result being true when $x \leq 2^{\wedge}N$ and being false when $x > 2^{\wedge}N$; and a second division section for outputting the value of x without alteration when the determination result is true and for outputting a value obtained by dividing x by $(2^{\wedge}(b*i))$, wherein:

the first bit shift section shifts x by a number of bits according to (N+b*i) (where i is an integer which is not negative) when the determination result is false;

the first memory section stores values of H(q) for values of q which are within the variable range of x; and the second bit shift section shifts the value output from the multiplication section by a number of bits according to y1 when the determination result is true and by a number of bits according to y1 and a*i when the determination result is false.

6. A decoding device according to claim 5, wherein:

the number of bits according to N is (D−N);

the number of bits according to (N+b*i) is D−(N+b*i);

the number of bits according to M is (D−M);

the number of bits according to y1 is (y1+N+M); and the number of bits according to y1 and a*i is (y1+N+M+a*i).

7. A decoding device according to claim 5, wherein the value of i is determined so that x satisfies $2^{\wedge}(N+b(i-1)) < x \leq 2^{\wedge}(N+bi)$.

8. A decoding device according to claim 5, further comprising a determination section for outputting a determination result being true when $x \leq 2^{\wedge}N$ and being false when $x > 2^{\wedge}N$, and further outputting a parameter i for specifying a value of x, wherein:

the first bit shift section and the second division section and the second shifting section operate according to the determination result from the determination section.

9. A decoding device according to claim 8, wherein the second bit shift section shifts the value output from the multiplication section by a number of bits according to y1 when the determination result is true and by a number of bits according to y1+(a*i) when the determination result is false.

10. A decoding device for extracting a variable quantization code x and a variable scaling factor y from an input bit stream containing the quantization code x and the scaling factor y and calculating x^(a/b)*2^(y/c) (where a, b and c are each an integer constant), the device comprising:

an isolation section for isolating x and y from the input bit stream;

a determination section for outputting a determination result being true when x≦2^N (where N is a predetermined threshold value) and being false when x>2^N, and further outputting a parameter j for specifying a value of x:

a first bit shift section for shifting x by a number of bits according to N when the determination result is true and by a number of bits according to (N+j) when the determination result is false so as to convert x to x1 which is in a fixed point format;

a first division section for calculating y1, where y1=int (y/c);

a second division section for outputting a value of x', wherein x'=x when the determination result is true and x' is an integer value of (x/(2^j));

a first memory section for storing, for all possible values of q^(where q is an integer such that 0≦q≦2^N) within a variable range of x', using q as an address, values of H(q) which have been converted to a fixed point format by shifting q^((a−b)/b) by a number of bits according to M (where M is an integer value of (N*(a−b))/b);

an adjustment coefficient generation section for generating values of I(p,j) in a fixed point format according to 2^(p/c)*2^(j/b) for all possible values of p such that 0≦p<c and all possible values of j;

a modulo calculation section for calculating y2=y%c;

a multiplication section for outputting a value obtained by multiplying together a value of H(x') which has been read out from the first memory section using x' as an address, a value of I(y2,j) corresponding to y2 and j which has been generated by the adjustment coefficient generation section and a value of x1 which has been converted by the first bit shift section; and a second bit shift section for shifting the output value from the multiplication section by a number of bits according to y1 when x≦2^N and by a number of bits according to y1 and j when x>2^N.

11. A decoding device according to claim 10, wherein the adjustment coefficient generation section includes a second memory section for storing values of I(p,j) using p and j as an address.

12. A decoding device according to claim 10, wherein the value of j is determined so as to satisfy 2^(N+(j−1)<x≦2^(N+j) when x>2^N, whereas j=0 when x≦2^N.

13. A decoding device according to claim 10, wherein a=4, b=3 and c=4.

14. A decoding device for extracting a variable quantization code x and a variable scaling factor y from an input bit stream containing the quantization code x and the scaling factor y and calculating x^(a/b)*2^(y/c) (where a, b and c are each an integer constant), the device comprising:

an isolation section for isolating x and y from the input bit stream;

a determination section for determining a number k of digits of x represented in a binary form;

a second division section for outputting a value of x', wherein the value of x' is obtained by shifting x up by (N−k) bits when the value of (N−k) is positive and by shifting x down by (k−N) bits when the value of (N−k) is negative;

a first bit shift section for shifting x by a number of bits according to k so as to convert x to x1 which is in a fixed point format;

a first division section for calculating y1, where y1=int (y/c);

a first memory section for storing, using at least lower (N−1) bits of q (where q is an integer such that 2^(N−1)≦q<2^N) as an address, values of H(q) which have been converted to a fixed point format by shifting q^((a−b)/b) by a number of bits according to M (where M is an integer value of (N*(a−b))/b);

an adjustment coefficient generation section for generating values of I(p,k) in a fixed point format according to 2^(p/c)*2^((k−N)/b) for all possible values of p such that 0≦p<c and all possible values of k;

a modulo calculation section for calculating y2=y%c;

a multiplication section for outputting a value obtained by multiplying together a value of H(x') which has been read out from the first memory section using the at least lower (N−1) bits of x' as an address, a value of I(y2,k) corresponding to y2 and k which has been generated by the adjustment coefficient generation section and a value of x1 which has been converted by the first bit shift section; and a second bit shift section for shifting the output value from the multiplication section by a number of bits according to y1, M and k.

15. A decoding device according to claim 14, wherein the adjustment coefficient generation section includes a second memory section for storing values of I(p,k) using p and k as an address.

16. A decoding device according to claim 14, wherein a=4, b=3 and c=4.

* * * * *